(12) United States Patent
Kamata

(10) Patent No.: US 8,928,466 B2
(45) Date of Patent: Jan. 6, 2015

(54) SEMICONDUCTOR DEVICE

(75) Inventor: Koichiro Kamata, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 792 days.

(21) Appl. No.: 13/191,940

(22) Filed: Jul. 27, 2011

(65) Prior Publication Data

US 2012/0032785 A1    Feb. 9, 2012

(30) Foreign Application Priority Data

Aug. 4, 2010 (JP) ................................. 2010-175416

(51) Int. Cl.
  *H04Q 3/00* (2006.01)
  *G06K 19/07* (2006.01)
(52) U.S. Cl.
  CPC ...... *G06K 19/07* (2013.01); *H04Q 2213/13095* (2013.01)
  USPC ...................... 340/14.69; 340/572.7; 235/492
(58) Field of Classification Search
  CPC  G06K 19/0701–19/0723; H01L 27/12–27/13; H01L 27/1214
  USPC .......................... 340/10.1–10.52, 14.6–14.69, 340/572.1–572.9; 235/492; 327/574–582; 455/226.2, 227–230, 234.1–253.2
  See application file for complete search history.

(56) References Cited

U.S. PATENT DOCUMENTS

| | | | |
|---|---|---|---|
| 5,731,856 | A | 3/1998 | Kim et al. |
| 5,744,864 | A | 4/1998 | Cillessen et al. |
| 6,294,274 | B1 | 9/2001 | Kawazoe et al. |
| 6,563,174 | B2 | 5/2003 | Kawasaki et al. |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Fortunato.E et al., "Wide-Bandgap High-Mobility ZNO Thin-Film Transistors Produced at Room Temperature,", Appl. Phys. Lett. (Applied Physics Letters), Sep. 27, 2004, vol. 85, No. 13, pp. 2541-2543.

(Continued)

*Primary Examiner* — Hai Phan
*Assistant Examiner* — Orlando Bousono
(74) *Attorney, Agent, or Firm* — Eric J. Robinson; Robinson Intellectual Property Law Office, P.C.

(57) ABSTRACT

A protection circuit is designed to operate when the level of a DC power supply potential which is generated in a rectifier circuit is equal to or greater than a predetermined level (a reference level), so as to decrease the level of the generated DC power supply potential. On the other hand, the protection circuit is designed not to operate when the DC power supply potential which is generated in the rectifier circuit is equal to or less than the predetermined level (the reference level), so as to use the generated DC power supply potential without change. A transistor of the protection circuit includes an oxide semiconductor layer, which enables a reduction in the off-state current of the transistor and a reduction in power consumption of the protection circuit.

25 Claims, 10 Drawing Sheets

(56) References Cited

U.S. PATENT DOCUMENTS

| | | | |
|---|---|---|---|
| 6,727,522 B1 | 4/2004 | Kawasaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,732,819 B2 | 6/2010 | Akimoto et al. | |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0133605 A1* | 6/2005 | Koyama et al. | 235/492 |
| 2005/0156656 A1* | 7/2005 | Rotzoll et al. | 327/423 |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0170505 A1* | 7/2007 | Tokunaga | 257/347 |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0249398 A1* | 10/2007 | Watanabe et al. | 455/558 |
| 2007/0252928 A1 | 11/2007 | Ito et al. | |
| 2007/0272922 A1 | 11/2007 | Kim et al. | |
| 2007/0285246 A1* | 12/2007 | Koyama | 340/572.1 |
| 2007/0287296 A1 | 12/2007 | Chang | |
| 2008/0006877 A1 | 1/2008 | Mardilovich et al. | |
| 2008/0011861 A1* | 1/2008 | Ikeda et al. | 235/492 |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0080214 A1* | 4/2008 | Umeda et al. | 363/37 |
| 2008/0083950 A1 | 4/2008 | Pan et al. | |
| 2008/0106191 A1 | 5/2008 | Kawase | |
| 2008/0123383 A1* | 5/2008 | Shionoiri | 363/127 |
| 2008/0128689 A1 | 6/2008 | Lee et al. | |
| 2008/0129195 A1 | 6/2008 | Ishizaki et al. | |
| 2008/0143531 A1* | 6/2008 | Tadokoro | 340/572.1 |
| 2008/0164978 A1* | 7/2008 | Tanada | 340/10.1 |
| 2008/0166834 A1 | 7/2008 | Kim et al. | |
| 2008/0174408 A1* | 7/2008 | Takahashi | 340/10.3 |
| 2008/0182358 A1 | 7/2008 | Cowdery-Corvan et al. | |
| 2008/0210762 A1* | 9/2008 | Osada et al. | 235/492 |
| 2008/0224133 A1 | 9/2008 | Park et al. | |
| 2008/0230821 A1* | 9/2008 | Shionoiri | 257/296 |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0258822 A1* | 10/2008 | Matsuzaki | 331/17 |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0085638 A1* | 4/2009 | Shionoiri et al. | 327/333 |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0200557 A1* | 8/2009 | Kamata | 257/66 |
| 2009/0236428 A1* | 9/2009 | Koyama et al. | 235/492 |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0066325 A1* | 3/2010 | Shionoiri | 323/282 |
| 2010/0072285 A1 | 3/2010 | Nishijima | |
| 2010/0078488 A1* | 4/2010 | Nagatsuka | 235/492 |
| 2010/0079203 A1 | 4/2010 | Furutani | |
| 2010/0079921 A1* | 4/2010 | Fujita | 361/56 |
| 2010/0084467 A1 | 4/2010 | Nishido | |
| 2010/0084475 A1* | 4/2010 | Hata et al. | 235/492 |
| 2010/0085030 A1* | 4/2010 | Inoue et al. | 323/312 |
| 2010/0085792 A1* | 4/2010 | Matsuzaki | 365/72 |
| 2010/0087222 A1* | 4/2010 | Yamashita et al. | 455/550.1 |
| 2010/0092800 A1 | 4/2010 | Itagaki et al. | |
| 2010/0109002 A1 | 5/2010 | Itagaki et al. | |
| 2010/0181384 A1* | 7/2010 | Matsuzaki | 235/492 |
| 2010/0253478 A1 | 10/2010 | Koyama et al. | |
| 2010/0328916 A1 | 12/2010 | Hirose et al. | |
| 2011/0101338 A1 | 5/2011 | Yamazaki et al. | |
| 2011/0148463 A1 | 6/2011 | Kato et al. | |
| 2011/0278564 A1 | 11/2011 | Yoneda | |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2006-180073 | 7/2006 |
| WO | WO-2004/114391 | 12/2004 |

OTHER PUBLICATIONS

Dembo.H et al., "RFCPUS on Glass and Plastic Substrates Fabricated by TFT Transfer Technology,", IEDM 05: Technical Digest of

(56) References Cited

OTHER PUBLICATIONS

International Electron Devices Meeting, Dec. 5, 2005, pp. 1067-1069.
Ikeda.T et al., "Full-Functional System Liquid Crystal Display Using CG-Silicon Technology,", SID Digest '04 : SID International Symposium Digest of Technical Papers, 2004, vol. 35, pp. 860-863.
Nomura.K et al., "Room-Temperature Fabrication of Transparent Flexible Thin-Film Transistors Using Amorphous Oxide Semiconductors,", Nature, Nov. 25, 2004, vol. 432, pp. 488-492.
Park.J et al., "Improvements in the Device Characteristics of Amorphous Indium Gallium Zinc Oxide Thin-Film Transistors by Ar Plasma Treatment,", Appl. Phys. Lett. (Applied Physics Letters) , Jun. 26, 2007, vol. 90, No. 26, pp. 262106-1-262106-3.
Takahashi.M et al., "Theoretical Analysis of IGZO Transparent Amorphous Oxide Semiconductor,", IDW '08 : Proceedings of the 15th International Display Workshops; Dec. 3, 2008, pp. 1637-1640.
Hayashi.R et al., "42.1: Invited Paper: Improved Amorphous In—Ga—Zn—O TFTS,", SID Digest '08 : SID International Symposium Digest of Technical Papers, May 20, 2008, vol. 39, pp. 621-624.
Prins.M et al., "A Ferroelectric Transparent Thin-Film Transistor,", Appl. Phys. Lett. (Applied Physics Letters) , Jun. 17, 1996, vol. 68, No. 25, pp. 3650-3652.
Nakamura.M et al., "The phase relations in the In2O3—Ga2ZnO4—ZnO system at 1350°C.,", Journal of Solid State Chemistry, Aug. 1, 1991, vol. 93, No. 2, pp. 298-315.
Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System,", Journal of Solid State Chemistry, Apr. 1, 1995, vol. 116, No. 1, pp. 170-178.
Nomura.K et al., "Thin-Film Transistor Fabricated in Single-Crystalline Transparent Oxide Semiconductor,", Science, May 23, 2003, vol. 300, No. 5623, pp. 1269-1272.
Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.
Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.
Osada.T et al., "15.2: Development of Driver-Integrated Panel using Amorphous In—Ga—Zn—Oxide TFT,", SID Digest '09 : SID International Symposium Digest of Technical Papers, May 31, 2009, pp. 184-187.
Nomura.K et al., "Carrier transport in transparent oxide semiconductor with intrinsic structural randomness probed using single-crystalline InGaO3(ZnO)5 films,", Appl. Phys. Lett. (Applied Physics Letters) , Sep. 13, 2004, vol. 85, No. 11, pp. 1993-1995.
Li.C et al., "Modulated Structures of Homologous Compounds InMO3(ZnO)m (M=in,Ga; m=Integer) Described by Four-Dimensional Superspace Group,", Journal of Solid State Chemistry, 1998, vol. 139, pp. 347-355.
Son.K et al., "42.4L: Late-News Paper: 4 Inch QVGA AMOLED Driven by the Threshold Voltage Controlled Amorphous GIZO (Ga2O3—In2O3—ZnO) TFT,", SID Digest '08 : SID International Symposium Digest of Technical Papers, May 20, 2008, vol. 39, pp. 633-636.
Lee.J et al., "World'S Largest (15-inch) XGA AMLCD Panel Using IGZO Oxide TFT,", SID Digest '08 : SID International Symposium Digest of Technical Papers, May 20, 2008, vol. 39, pp. 625-628.
Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.
Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.
Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.
Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.
Jeong.J et al., "3.1: Distinguished Paper: 12.1-Inch WXGA AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.
Park.J et al., "High performance amorphous oxide thin film transistors with self-aligned top-gate structure,", IEDM 09: Technical Digest of International Electron Devices Meeting, Dec. 7, 2009, pp. 191-194.
Kurokawa.Y et al., "UHF RFCPUS on Flexible and Glass Substrates for Secure RFID Systems,", Journal of Solid-State Circuits , 2008, vol. 43, No. 1, pp. 292-299.
Ohara.H et al., "Amorphous In—Ga—Zn—Oxide TFTs with Suppressed Variation for 4.0 inch QVCA AMOLED Display,", AM-FPD '09 Digest of Technical Papers, Jul. 1, 2009, pp. 227-230, The Japan Society of Applied Physics.
Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.
Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.
Lee.M et al., "15.4:Excellent Performance of Indium—Oxide-Based Thin-Film Transistors by DC Sputtering,", SID Digest '09 : SID International Symposium Digest of Technical Papers, May 31, 2009, pp. 191-193.
Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.
Sakata.J et al., "Development of 4.0-In. AMOLED Display With Driver Circuit Using Amorphous In—Ga—Zn—Oxide TFTs,", IDW '09 : Proceedings of the 16th International Display Workshops, 2009, pp. 689-692.
Park.J et al., "Amorphous Indium—Gallium—Zinc Oxide TFTs and Their Application for Large Size AMOLED,", AM-FPD '08 Digest of Technical Papers, Jul. 2, 2008, pp. 275-278.
Park.S et al., "Challenge to Future Displays: Transparent AM-OLED Driven by Peald Grown ZNO TFT,", IMID '07 Digest, 2007, pp. 1249-1252.
Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.
Osada.T et al., "Development of Driver-Integrated Panel Using Amorphous In—Ga—Zn—Oxide TFT,", AM-FPD '09 Digest of Technical Papers, Jul. 1, 2009, pp. 33-36.
Hirao.T et al., "Novel Top-Gate Zinc Oxide Thin-Film Transistors (ZNO TFTs) for AMLCDs,", Journal of the SID, 2007, vol. 15, No. 1, pp. 17-22.
Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.
Godo.H et al., "P-9:Numerical Analysis on Temperature Dependence of Characteristics of Amorphous In—Ga—Zn—Oxide TFT,", SID Digest '09 : SID International Symposium Digest of Technical Papers, May 31, 2009, pp. 1110-1112.
Ohara.H et al., "21.3:4.0 In. QVGA AMOLED Display Using In—Ga—Zn—Oxide TFTs With a Novel Passivation Layer,", SID Digest '09 : SID International Symposium Digest of Technical Papers, May 31, 2009, pp. 284-287.

(56) References Cited

OTHER PUBLICATIONS

Miyasaka.M, "Suftla Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al., "Spinel,YBFE2O4, and YB2FE3O7 Types of Structures for Compounds in the IN2O3 and SC2O3—A2O3—BO Systems [A; Fe, Ga, or Al; B: Mg, Mn, Fe, Ni, Cu,or Zn] At Temperatures Over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZNO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters) , Sep. 1, 2003, vol. 83, No. 9, pp. 1755-1757.

* cited by examiner

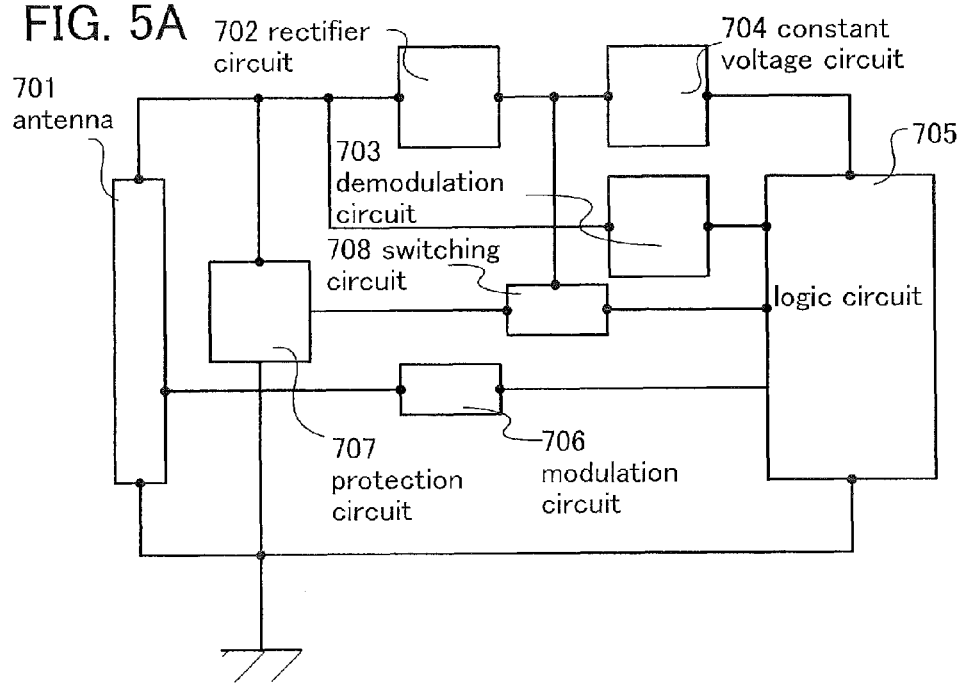
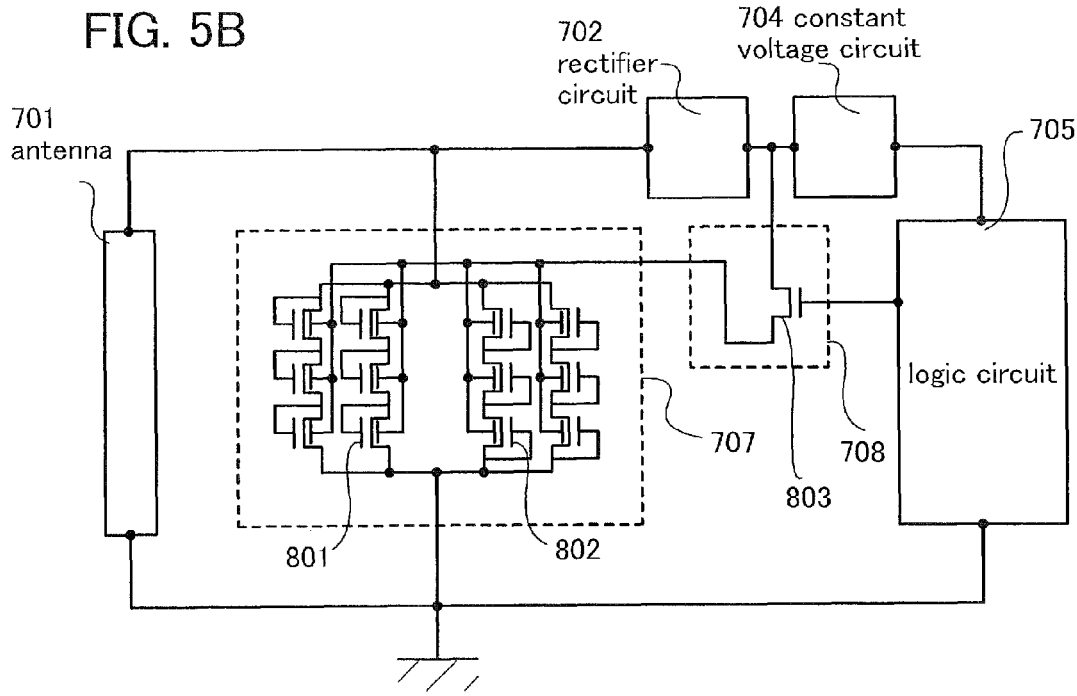

SEMICONDUCTOR DEVICE

BACKGROUND OF THE INVENTION

1. Field of the Invention

The present invention to be disclosed in this specification relates to a semiconductor device capable of communicating (transmitting and receiving) data wirelessly (a data carrier). In particular, the present invention relates to a protection circuit which prevents breakage or deterioration of elements which are included in a semiconductor device when the semiconductor device receives high power in wireless communication.

2. Description of the Related Art

In recent years, individual identification technologies have attracted attention. In these technologies, an identification (ID) number is assigned to each object to recognize the history of information on the object and to be utilized in production, management, or the like. In particular, radio-frequency identification (RFID) techniques for transmitting and receiving data by wireless communication have been widely used. A wireless communication system using the RFID technique is a communication system including a wireless communication device (an interrogator) and a data carrier (a transponder), and data is wirelessly communicated between them. The wireless communication device refers to a device capable of wirelessly transmitting and receiving signals, such as a reader/writer, a cellular phone, or a personal computer. In this specification, the wireless communication device is typically referred to as a reader/writer. In addition, the data carrier is generally called an RFID, an RF tag, an ID tag, an IC tag, an IC chip, a wireless tag, an electronic tag, or the like. In this specification, the data carrier is typically referred to as an RFID.

Examples of RFIDs include passive RFIDs which do not have power sources and active RFIDs which incorporate power sources. The passive RFID has a function to convert a wireless signal (a carrier wave or an amplitude-modulated wave generated by superimposing a modulation wave on a carrier wave) transmitted from a reader/writer into a DC voltage by a rectifier circuit which is provided in the RFID, and circuits in the RFID operate using the DC voltage. The strength of the carrier wave is generally expressed as power, and power is attenuated as the distance between an emission point of the power and a measurement point of the power (hereinafter referred to as a communication distance in this specification) is increased. In other words, when the communication distance between the reader/writer and the RFID is changed, power which is supplied to the RFID is also changed in accordance with the change in communication distance. Then, in the case where the communication distance between the reader/writer and the RFID is extremely short (for example, in the case where they are in contact with each other), high power is supplied to the RFID. When the RFID is supplied with high power, the RFID might malfunction because of incorrect demodulation of signals from the reader/writer, or elements provided in the RFID might be deteriorated or damaged.

On the other hand, the wireless communication system using the RFID technique has an advantage that data in a plurality of RFIDs can be read at the same time by a reader/writer; however, when the data of the plurality of RFIDs is read at the same time, a communication distance between each of the plurality of RFIDs and the reader/writer might be different. Further, the communication distance changes from moment to moment in the case where a carton of products provided with an RFID is passed in front of a reader/writer by using a forklift. In view of the foregoing actual uses of such a wireless communication system, the communication distance might be extremely short unintentionally, and as a result, high power might be supplied to an RFID.

In order to resolve such a problem, provision of a protection circuit which protects elements in an RFID when high power is applied to the RFID has been known (for example, see Reference 1).

The protection circuit has a function to control the state of a dedicated path which allows high power to escape. When the communication distance is long and received power is low, the dedicated path which allows high power to escape is put in an off state so that the operation of the RFID is not adversely affected. On the other hand, when the communication distance is short and received power is high, the dedicated path which allows high power to escape is put in an on state so that high power is not applied to the elements in the RFID.

REFERENCE

[Reference 1] Japanese Published Patent Application No. 2006-180073

SUMMARY OF THE INVENTION

It is preferable that the protection circuit operates normally when the communication distance is extremely short and does not consume power when the communication distance is long, i.e., when the RFID is supplied with low power.

It is an object of one embodiment of the present invention to provide a highly reliable semiconductor device (an RFID) including a protection circuit which operates normally even when the communication distance is extremely short and which consumes little power when the communication distance is long.

One embodiment of the present invention employs the following configuration to achieve the above object. In other words, a feature of one embodiment of the present invention is to provide a protection circuit for protecting an element which is included in a semiconductor device (an RFID) capable of wirelessly communicating data. The protection circuit is designed to operate when the level of a DC power supply potential which is generated in a rectifier circuit is equal to or greater than a predetermined level (a reference level), so as to decrease the level of the generated DC power supply potential. On the other hand, the protection circuit is designed not to operate when the DC power supply potential which is generated in the rectifier circuit is equal to or less than the predetermined level (the reference level), so as to use the generated DC power supply potential without change. A transistor of the protection circuit includes an oxide semiconductor layer, which enables a reduction in the off-state current of the transistor and a reduction in power consumption of the protection circuit.

One embodiment according to the present invention is a semiconductor device which includes a rectifier circuit configured to generate an internal voltage by rectifying a carrier wave or an amplitude-modulated wave received via an antenna; a protection circuit including a first transistor having a gate electrode and a drain electrode each electrically connected to the antenna, a source electrode grounded, and a semiconductor layer formed with an oxide semiconductor layer and a second transistor having a source electrode electrically connected to the antenna, a gate electrode and a drain electrode each grounded, and a semiconductor layer formed with an oxide semiconductor layer; a demodulation circuit configured to generate an internal signal by demodulating the carrier wave or the amplitude-modulated wave received via the antenna; a constant voltage circuit configured to output as a power supply voltage a constant voltage obtained from the internal voltage generated by the rectifier circuit; a logic circuit configured to analyze the power supply voltage generated by the constant voltage circuit and the internal signal generated by the demodulation circuit and generate a response signal; and a modulation circuit configured to output a modulated signal to the antenna by modulating a signal from the logic circuit. The protection circuit operates when the amplitude of the carrier wave or the amplitude-modulated wave received by the antenna is equal to or greater than the minimum operating voltage for the rectifier circuit.

Another embodiment according to the present invention is a semiconductor device which includes a rectifier circuit configured to generate an internal voltage by rectifying a carrier wave or an amplitude-modulated wave received via an antenna; a protection circuit including a first transistor having a first gate electrode and a drain electrode each electrically connected to the antenna, a source electrode grounded, a second gate electrode, and a semiconductor layer formed with an oxide semiconductor layer and a second transistor having a source electrode electrically connected to the antenna, a first gate electrode and a drain electrode each grounded, a second gate electrode, and a semiconductor layer formed with an oxide semiconductor layer; a demodulation circuit configured to generate an internal signal by demodulating the carrier wave or the amplitude-modulated wave received via the antenna; a constant voltage circuit configured to output as a power supply voltage a constant voltage obtained from the internal voltage generated by the rectifier circuit; a logic circuit configured to analyze the power supply voltage generated by the constant voltage circuit and the internal signal generated by the demodulation circuit and generate a response signal; and a modulation circuit configured to output a modulated signal to the antenna by modulating a signal from the logic circuit. The protection circuit operates when the amplitude of the carrier wave or the amplitude-modulated wave received by the antenna is equal to or greater than the minimum operating voltage for the rectifier circuit.

Another embodiment according to the present invention is a semiconductor device which includes a rectifier circuit configured to generate an internal voltage by rectifying a carrier wave or an amplitude-modulated wave received via an antenna; a protection circuit including a first transistor having a first gate electrode and a drain electrode each electrically connected to the antenna, a source electrode grounded, a second gate electrode, and a semiconductor layer formed with an oxide semiconductor layer and a second transistor having a source electrode electrically connected to the antenna, a first gate electrode and a drain electrode each grounded, a second gate electrode, and a semiconductor layer formed with an oxide semiconductor layer; a demodulation circuit configured to generate an internal signal by demodulating the carrier wave or the amplitude-modulated wave received via the antenna; a constant voltage circuit configured to output as a power supply voltage a constant voltage obtained from the internal voltage generated by the rectifier circuit; a logic circuit configured to analyze the power supply voltage generated by the constant voltage circuit and the internal signal generated by the demodulation circuit and generate a response signal; a modulation circuit configured to output a modulated signal to the antenna by modulating a first signal from the logic circuit; and a switching circuit configured to control the protection circuit with a second signal from the logic circuit. The protection circuit operates with reference to the internal voltage output from the rectifier circuit through the switching circuit with the second signal from the logic circuit, when the amplitude of the carrier wave or the amplitude-modulated wave received by the antenna is equal to or greater than the minimum operating voltage for the rectifier circuit.

In each of the above embodiments, the semiconductor device may further include a clock generation circuit electrically connected to the logic circuit, the modulation circuit, and the constant voltage circuit.

A semiconductor device (an RFID) according to one embodiment of the present invention does not have a limitation on a frequency band for communication with a reader/writer and can be applied to an RFID using an arbitrary frequency band. Specifically, the RFID according to one embodiment of the present invention can be applied to any of the cases of using frequencies in an HF band of 3 MHz to 30 MHz (for example, 13.56 MHz), a UHF band of 300 MHz to 3 GHz (for example, 433 MHz, 953 MHz, or 2.45 GHz), and 135 kHz.

An RFID according to one embodiment of the present invention includes all devices capable of communicating data wirelessly, such as an RF tag, an ID tag, an IC tag, an IC chip, a wireless tag, and an electronic tag.

Note that the expression "A and B are connected to each other" in this specification includes a case where A and B are electrically connected to each other (that is, a case where A and B are connected to each other with another element or another circuit interposed therebetween), a case where A and B are functionally connected to each other (that is, a case where A and B are functionally connected to each other with another circuit interposed therebetween), and a case where A and B are directly connected to each other (that is, a case where A and B are connected to each other without any other element or circuit interposed therebetween).

A semiconductor device (an RFID) including a protection circuit according to one embodiment of the present invention can protect an internal element from high power which is received by the RFID, even when the communication distance is extremely short. In addition, the semiconductor device can suppress power consumption of the protection circuit when the communication distance is long. Thus, it is possible to provide a highly reliable semiconductor device because the protection circuit operates normally even when the communication distance is extremely short and the power consumption of the protection circuit is low even when the communication distance is long.

BRIEF DESCRIPTION OF THE DRAWINGS

FIGS. 5A and 5B are block diagrams illustrating a whole RFID and a protection circuit according to one embodiment of the present invention.

DETAILED DESCRIPTION OF THE INVENTION

Figure 1A:
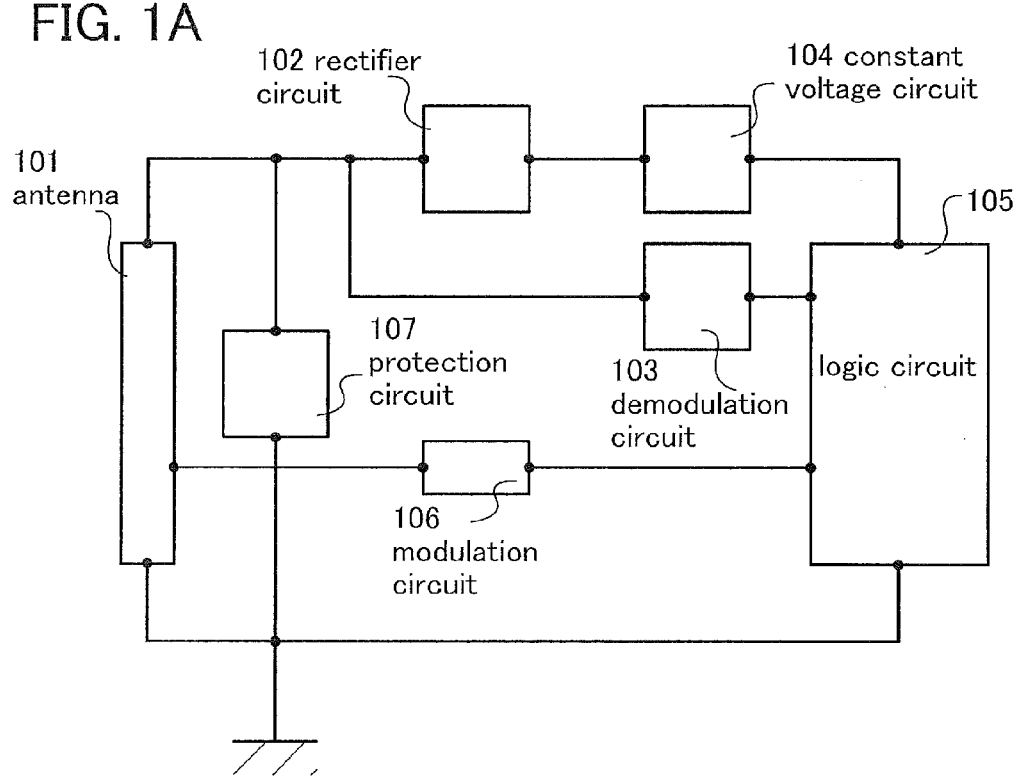
FIGS. 1A and 1B are block diagrams illustrating a whole RFID and a protection circuit according to one embodiment of the present invention.

Embodiments and an example of the present invention will be described in detail with reference to the accompanying drawings. Note that the present invention is not limited to the following description and it will be readily appreciated by those skilled in the art that the modes and details of the present invention can be modified in various ways without departing from the spirit and scope thereof. In addition, in the embodiments and the example of the present invention which will be described below, the same portions are commonly denoted by the same reference numerals in different drawings.

In addition, each of the embodiments and the example described below can be implemented by being combined with any of the other embodiments and the example which are described in this specification unless otherwise mentioned.

Embodiment 1

In this embodiment, circuits which can be used for a semiconductor device of the present invention are described with reference to FIGS. 1A and 1B and FIG. 2.

FIG. 1A is a block diagram illustrating a configuration of a semiconductor device. The semiconductor device includes the following components: an antenna 101 which receives a carrier wave or an amplitude-modulated wave; a rectifier circuit 102 which generates an internal voltage Vin by rectifying the carrier wave or the amplitude-modulated wave received by the antenna 101; a demodulation circuit 103 which generates an internal signal by demodulating the carrier wave or the amplitude-modulated wave received by the antenna 101; a constant voltage circuit 104 which outputs as a power supply voltage Vdd a constant voltage obtained from the internal voltage Vin generated by the rectifier circuit 102; a logic circuit 105 which analyzes the power supply voltage Vdd generated by the constant voltage circuit 104 and a signal using the demodulated signal generated by the demodulation circuit 103 and generates a response signal; a modulation circuit 106 which outputs a modulated signal to the antenna 101 by modulating a signal from the logic circuit 105; and a protection circuit 107 which operates when the amplitude of an AC voltage generated by the antenna 101 is high and which cuts part of an excess of the amplitude of the carrier wave or the amplitude-modulated wave received by the antenna 101 when the amplitude of the wave is higher than a limit voltage Vlim.

Note that the limit voltage Vlim can be set to a given level, but is preferably set to a level equal to or greater than the minimum operating voltage for a circuit provided in the subsequent stage.

A configuration of the protection circuit 107 is described below with reference to FIG. 1B.

Figure 1B:
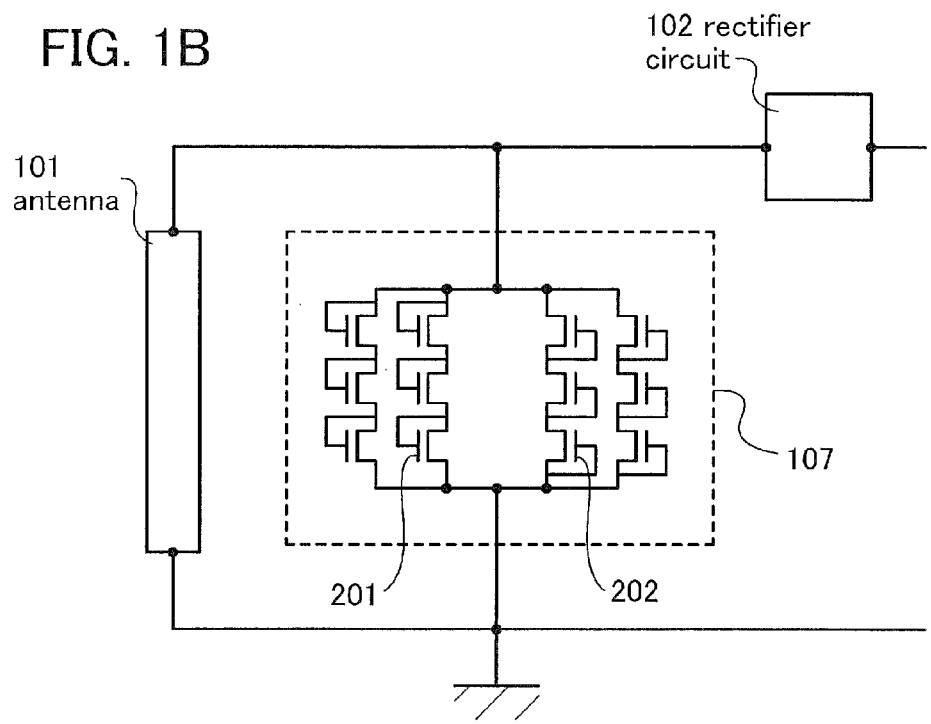

The protection circuit 107 illustrated in FIG. 1B includes a first terminal and a second terminal. Note that the first terminal is electrically connected to the antenna 101, and the second terminal is grounded. The protection circuit 107 includes a first transistor 201 having a drain electrode and a gate electrode each electrically connected to the antenna and a source electrode grounded and a second transistor 202 having a source electrode electrically connected to the antenna and a drain electrode and a gate electrode each grounded.

In FIG. 1B, two rows of first transistors 201, three in each row, which are connected in series, and two rows of second transistors 202, three in each row, which are connected in series, are connected in parallel; however, the configuration of the protection circuit 107 is not limited to this configuration. The protection circuit 107 may have a configuration in which the number of first transistors 201 is equal to the number of second transistors 202 and the first transistors 201 and the second transistors 202 are connected in parallel. Note that the connection between the first transistors 201 and the connection between the second transistors 202 are not limited to serial connection or parallel connection, and the first transistors 201 and the second transistors 202 may be connected in a given way.

The protection circuit 107 operates when the amplitude of the carrier wave or the amplitude-modulated wave received by the antenna 101 is high. In other words, when the amplitude is equal to or greater than a certain positive voltage, the first transistor 201 is turned on, and when equal to or less than a certain negative voltage, the second transistor 202 is turned on. The first transistor 201 and the second transistor 202 are turned on when the amplitude of the carrier wave or the amplitude-modulated wave input to the rectifier circuit 102 is equal to or greater than a certain value; thus, part of an excessive carrier wave or amplitude-modulated wave received by the antenna 101 is consumed by the protection circuit 107 and the load on the rectifier circuit 102 and the demodulation circuit 103 in the subsequent stage is reduced.

In addition, when a plurality of first transistors 201 are connected in series and a plurality of second transistors 202 are connected in series, the operating voltage for the protection circuit 107 is determined by the number of transistors which are connected in series. Further, when the plurality of first transistors 201 which are connected in series and the plurality of second transistors 202 which are connected in series are connected in parallel, the amount of current which can flow simultaneously can be increased.

Furthermore, the first transistor 201 and the second transistor 202 each include an oxide semiconductor layer as a semiconductor layer. FIG. 2 illustrates an example of a cross-sectional structure of a transistor including an oxide semiconductor layer as a semiconductor layer.

Figure 2:
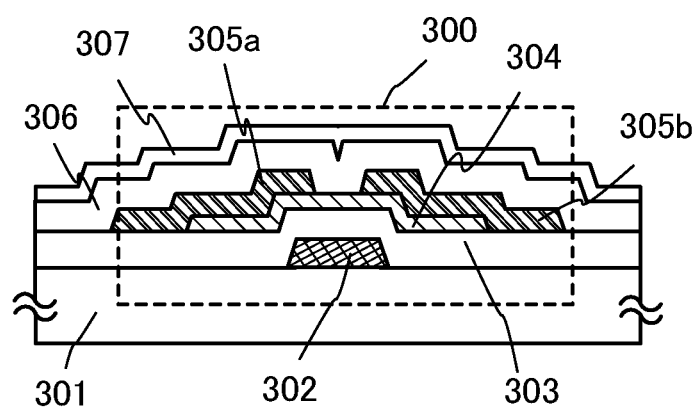
FIG. 2 is a cross-sectional view illustrating an example of a transistor according to one embodiment of the present invention.

A transistor 300 which is illustrated in FIG. 2 and includes an oxide semiconductor layer as a semiconductor layer is an example of bottom-gate transistors and is also referred to as an inverted staggered transistor. The present invention is not limited thereto, and for example, a gate electrode layer may be positioned over a semiconductor layer.

The transistor 300 includes a gate electrode 302, a gate insulating layer 303, an oxide semiconductor layer 304, a source or drain electrode 305a, and a source or drain electrode 305b over a substrate 301 having an insulating surface. An insulating layer 306 which covers the transistor 300 and is in contact with the oxide semiconductor layer 304 is also provided. Furthermore, a protective insulating layer 307 is formed over the insulating layer 306.

In this embodiment, the oxide semiconductor layer 304 is used as a semiconductor layer. The oxide semiconductor layer 304 can be formed using an oxide semiconductor, for example, a four-component metal oxide such as an In—Sn—Ga—Zn—O-based oxide semiconductor, a three-component metal oxide such as an In—Ga—Zn—O-based oxide semiconductor, an In—Sn—Zn—O-based oxide semiconductor, an In—Hf—Zn—O-based oxide semiconductor, an In—Al—Zn—O-based oxide semiconductor, a Sn—Ga—Zn—O-based oxide semiconductor, an Al—Ga—Zn—O-based oxide semiconductor, or a Sn—Al—Zn—O-based oxide semiconductor, a two-component metal oxide such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, or an In—Mg—O-based oxide semiconductor, an In—O-based oxide semiconductor, a Sn—O-based oxide semiconductor, a Zn—O-based oxide semiconductor, or the like. Further, $SiO_2$ may be added to the above-described oxide semiconductor. Here, for example, the In—Ga—Zn—O-based oxide semiconductor means an oxide containing at least In, Ga, and Zn, and there is no limitation on the composition ratio thereof. In addition, the oxide semiconductor may contain an element other than In, Ga, and Zn.

For the oxide semiconductor layer 304, an oxide semiconductor represented by the chemical formula, $InMO_3(ZnO)_m$ (m>0) can be used. Here, M represents one or more metal elements selected from Sn, Hf, Ga, Al, Mn, and Co. For example, M may be Ga, Ga and Al, Ga and Mn, Ga and Co, or the like.

There is no particular limitation on a substrate which can be used as the substrate 301. For example, a glass substrate, a quartz substrate, or the like which is used in a liquid crystal display device or the like can be used. Alternatively, a substrate in which an insulating layer is formed over a silicon wafer, or the like may be used.

The gate electrode 302 can be formed using a metal material such as molybdenum, titanium, chromium, tantalum, tungsten, aluminum, copper, neodymium, or scandium or an alloy material which contains any of these materials as its main component. The gate electrode 302 can have a single-layer structure or a stacked-layer structure.

Note that an insulating layer serving as a base may be provided between the substrate 301 and the gate electrode 302. The insulating layer has the function of preventing diffusion of an impurity element from the substrate, and can be formed using one or more films of a silicon nitride film, a silicon oxide film, a silicon nitride oxide film, and a silicon oxynitride film.

The gate insulating layer 303 can be formed using one or more films of a silicon oxide film, a silicon nitride film, a silicon oxynitride film, a silicon nitride oxide film, an aluminum oxide film, an aluminum nitride film, an aluminum oxynitride film, an aluminum nitride oxide film, a hafnium oxide film, and the like by a plasma CVD method, a sputtering method, or the like. For example, the gate insulating layer 303 can be formed in such a manner that a silicon nitride film ($SiN_y$ (y>0)) with a thickness of 50 nm to 200 nm is formed as a first gate insulating layer by a plasma CVD method and a silicon oxide film ($SiO_x$ (x>0)) with a thickness of 5 nm to 300 nm is formed as a second gate insulating layer over the first gate insulating layer by a sputtering method. For example, the gate insulating layer 303 is formed to have a total thickness of 200 nm.

The source or drain electrode 305a and the source or drain electrode 305b can be formed using a metal material such as molybdenum, titanium, chromium, tantalum, tungsten, aluminum, copper, neodymium, or scandium or an alloy material which includes any of these materials as a main component. For example, the source or drain electrode 305a and the source or drain electrode 305b can have a stacked structure of a layer of a metal such as aluminum or copper and a layer of a high-melting-point metal such as titanium, molybdenum, or tungsten. An aluminum material including an element which prevents generation of hillocks or whiskers (e.g., silicon, neodymium, or scandium) may be used for higher heat resistance.

A conductive metal oxide film may be used as a conductive film to be the source or drain electrode 305a and the source or drain electrode 305b. As a conductive metal oxide, indium oxide ($In_2O_3$), tin oxide ($SnO_2$), zinc oxide (ZnO), indium oxide-tin oxide alloy ($In_2O_3$—$SnO_2$, which is abbreviated as ITO in some cases), indium oxide-zinc oxide alloy ($In_2O_3$—ZnO), any of these metal oxide materials in which silicon oxide is contained, or the like can be used.

As the insulating layer 306, an inorganic insulating film such as a silicon oxide film, a silicon oxynitride film, a gallium oxide film, an aluminum oxide film, or an aluminum oxynitride film can be typically used.

For the protective insulating layer 307, an inorganic insulating film such as a silicon nitride film, an aluminum nitride film, a silicon nitride oxide film, or an aluminum nitride oxide film can be used.

In addition, a planarization insulating film for reducing surface unevenness due to the transistor may be formed over the protective insulating layer 307. As the planarization insulating film, an organic material such as polyimide, acrylic, or benzocyclobutene can be used. Other than such organic materials, it is also possible to use a low-dielectric constant material (a low-k material) or the like. Note that the planarization insulating film may be formed by stacking a plurality of insulating films formed with these materials.

A feature of the first transistor 201 and the second transistor 202 including an oxide semiconductor in the above configuration is an extremely small off-state current. When the amplitude of the carrier wave or the amplitude-modulated wave received by the antenna 101 is low, i.e., when the distance between the semiconductor device and a wireless communication device is long, it is not preferable that the protection circuit 107 consumes power. With the use of transistors including an oxide semiconductor as the first transistor 201 and the second transistor 202, the loss of power at the protection circuit 107 can be minimized when the amplitude of the carrier wave or the amplitude-modulated wave received by the antenna 101 is low.

Another feature of transistors including an oxide semiconductor in semiconductor layers is high resistance of the protection circuit to electrical load and heat generation. It is generally assumed that the protection circuit is under a relatively high electrical load and generates heat. In a commonly used Si transistor, element heat generation may lead to progression of deterioration of characteristics, which may induce dielectric breakdown and cause a defect in the worst case. In this respect, the transistor including an oxide semiconductor in a semiconductor layer has an extremely high resistance to electrical load and heat generation. Thus, with the use of transistors including an oxide semiconductor in semiconductor layers as the protection circuit, the resistance of the protection circuit to electrical load and heat generation can be improved. Therefore, even when a signal with high amplitude is supplied from the antenna 101, the protection circuit can operate normally and a highly reliable semiconductor device can be provided.

In this manner, the protection circuit 107 described above is provided in the semiconductor device. Thus, it is possible to obtain a highly reliable semiconductor device because the protection circuit operates normally even when a signal with high amplitude is supplied to the semiconductor device and consumes little power even when the communication distance is long.

Embodiment 2

In this embodiment, a configuration in which circuits that can be used for an antenna, a rectifier circuit, and a protection circuit differ from those in Embodiment 1 is described with reference to FIGS. 3A and 3B and FIGS. 4A and 4B.

Circuits that can be used for a semiconductor device of the present invention are described below with reference to FIGS. 3A and 3B.

Figure 3A:
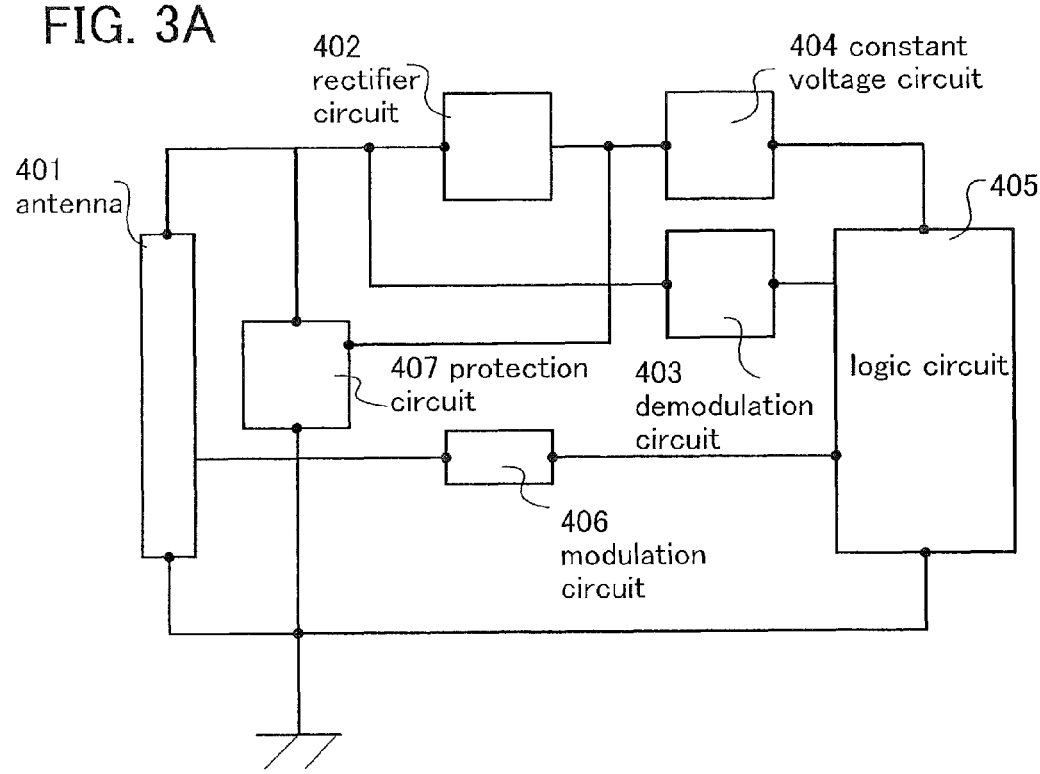
FIGS. 3A and 3B are block diagrams illustrating a whole RFID and a protection circuit according to one embodiment of the present invention.

FIG. 3A is a block diagram illustrating a configuration of a semiconductor device. The semiconductor device includes the following components: an antenna 401 which receives a carrier wave or an amplitude-modulated wave; a rectifier circuit 402 which generates an internal voltage Vin by rectifying the carrier wave or the amplitude-modulated wave; a demodulation circuit 403 which generates an internal signal by demodulating the carrier wave or the amplitude-modulated wave received by the antenna 401; a constant voltage circuit 404 which outputs as a power supply voltage Vdd a constant voltage obtained from the internal voltage Vin generated by the rectifier circuit 402; a logic circuit 405 which analyzes the power supply voltage Vdd generated by the constant voltage circuit 404 and a signal using the demodulated signal generated by the demodulation circuit 403 and generates a response signal; a modulation circuit 406 which outputs a modulated signal to the antenna 401 by modulating a signal from the logic circuit 405; and a protection circuit 407 which cuts part of an excess of the amplitude of the carrier wave or the amplitude-modulated wave received by the antenna 401 when the amplitude of the wave is higher than a limit voltage Vlim and which refers to the internal voltage Vin from the rectifier circuit 402 and suppresses an increase in the internal voltage Vin.

A configuration of the protection circuit 407 is described below with reference to FIG. 3B.

Figure 3B:
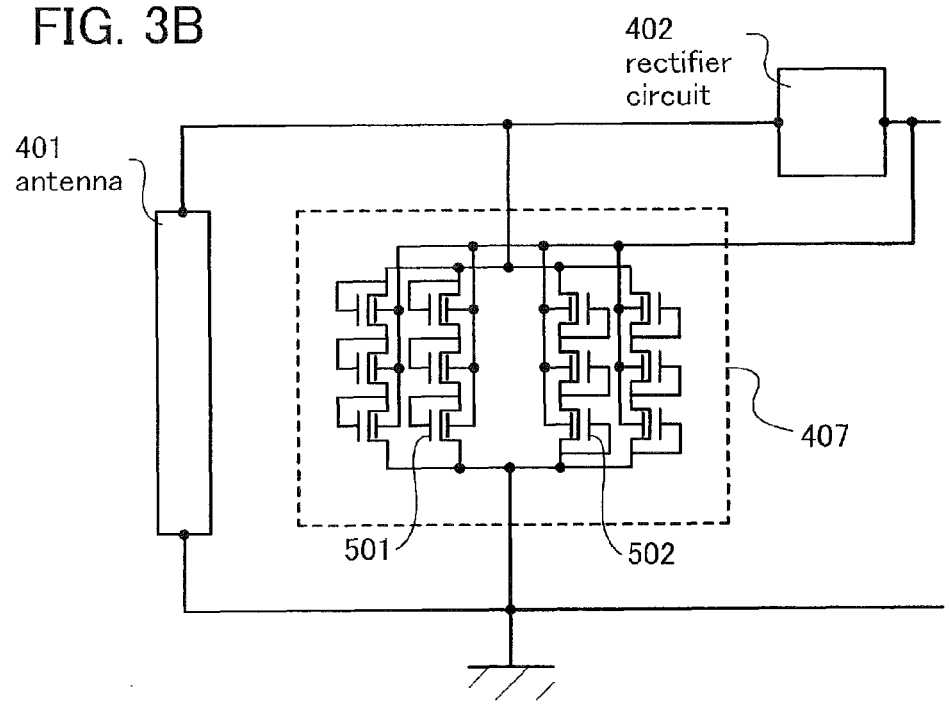

The protection circuit 407 illustrated in FIG. 3B includes a first terminal, a second terminal, and a third terminal. Note that the first terminal is electrically connected to the antenna 401, the second terminal is grounded, and the third terminal is electrically connected to an output terminal of the rectifier circuit 402.

The protection circuit 407 includes a first transistor 501 having a drain electrode and a first gate electrode each electrically connected to the antenna, a source electrode grounded, and a second gate electrode electrically connected to the output terminal of the rectifier circuit 402 and a second transistor 502 having a source electrode electrically connected to the antenna, a drain electrode and a first gate electrode each grounded, and a second gate electrode electrically connected to the output terminal of the rectifier circuit 402.

In FIG. 3B, two rows of first transistors 501, three in each row, which are connected in series, and two rows of second transistors 502, three in each row, which are connected in series, are connected in parallel; however, the configuration of the protection circuit 407 is not limited to this configuration. The protection circuit 407 may have a configuration in which one or more first transistors 501 and one or more second transistors 502 are provided and the one or more first transistors 501 and the one or more second transistors 502 are connected in parallel. Note that the connection between the first transistors 501 and the connection between the second transistors 502 are not limited to serial connection or parallel connection, and the first transistors 501 and the second transistors 502 may be connected in a given way.

The protection circuit 407 operates when the amplitude of the carrier wave or the amplitude-modulated wave received by the antenna 401 is high. In other words, when the amplitude is equal to or greater than a certain positive voltage, the first transistor 501 is turned on, and when equal to or less than a certain negative voltage, the second transistor 502 is turned on. The first transistor 501 and the second transistor 502 are turned on when the amplitude of the carrier wave or the amplitude-modulated wave input to the rectifier circuit 402 is equal to or greater than a certain value; thus, part of an excessive carrier wave or amplitude-modulated wave received by the antenna 401 is consumed by the protection circuit 407 and the load on the rectifier circuit 402 and the demodulation circuit 403 in the subsequent stage is reduced.

The third terminal included in the protection circuit 407 and electrically connected to the output terminal of the rectifier circuit 402 is connected to the second gate electrodes of the first transistor 501 and the second transistor 502. Therefore, when the amplitude of the carrier wave or the amplitude-modulated wave input to the rectifier circuit 402 is equal to or greater than a certain value, the potential of the second gate electrodes of the first transistor 501 and the second transistor 502 is increased. The first transistor 501 and the second transistor 502 each include an oxide semiconductor layer as a semiconductor layer, and the first transistor 501 and the second transistor 502 shows normally-on transistor characteristics with a shift in the threshold voltage of the transistor in the negative direction when the potential of the second gate electrode is increased. Thus, the first transistor 501 and the second transistor 502 are turned on, the amount of current consumed by the protection circuit 407 is increased, and the load on the rectifier circuit 402 and the demodulation circuit 403 in the subsequent stage is further reduced.

Figure 4A:
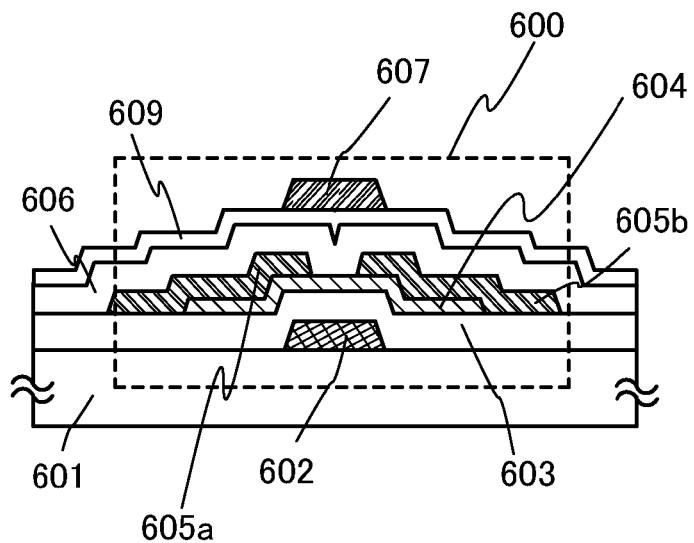
FIGS. 4A and 4B are a cross-sectional view illustrating an example of a transistor according to one embodiment of the present invention and a circuit symbol of the transistor.

Furthermore, the first transistor 501 and the second transistor 502 each include an oxide semiconductor layer as a semiconductor layer. FIG. 4A illustrates an example of a cross-sectional structure of a transistor including an oxide semiconductor layer as a semiconductor layer.

A transistor 600 which is illustrated in FIG. 4A and includes an oxide semiconductor layer as a semiconductor layer is an example of dual-gate transistors.

The transistor 600 includes a first gate electrode 602, a gate insulating layer 603, an oxide semiconductor layer 604, a source or drain electrode 605a, and a source or drain electrode 605b over a substrate 601 having an insulating surface. An insulating layer 606 which covers the transistor 600 and is in contact with the oxide semiconductor layer 604 is also provided. Furthermore, a protective insulating layer 609 is formed over the insulating layer 606. Moreover, a second gate electrode 607 is provided opposite the first gate electrode 602 with the insulating layer 606 and the protective insulating layer 609 interposed between the second gate electrode 607 and the oxide semiconductor layer 604.

In this embodiment, the oxide semiconductor layer 604 is used as a semiconductor layer. The oxide semiconductor layer 604 can be formed using an oxide semiconductor, for example, a four-component metal oxide such as an In—Sn—Ga—Zn—O-based oxide semiconductor, a three-component metal oxide such as an In—Ga—Zn—O-based oxide semiconductor, an In—Sn—Zn—O-based oxide semiconductor, an In—Hf—Zn—O-based oxide semiconductor, an In—Al—Zn—O-based oxide semiconductor, a Sn—Ga—Zn—O-based oxide semiconductor, an Al—Ga—Zn—O-based oxide semiconductor, or a Sn—Al—Zn—O-based oxide semiconductor, a two-component metal oxide such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, or an In—Mg—O-based oxide semiconductor, an In—O-based oxide semiconductor, a Sn—O-based oxide semiconductor, or a Zn—O-based oxide semiconductor. Further, $SiO_2$ may be added to the above-described oxide semiconductor. Here, for example, the In—Ga—Zn—O-based oxide semiconductor means an oxide containing at least In, Ga, and Zn, and there is no limitation on the composition ratio thereof. In addition, the oxide semiconductor may contain an element other than In, Ga, and Zn.

For the oxide semiconductor layer 604, an oxide semiconductor represented by the chemical formula, $InMO_3(ZnO)_m$ (m>0) can be used. Here, M represents one or more metal elements selected from Sn, Hf, Ga, Al, Mn, and Co. For example, M may be Ga, Ga and Al, Ga and Mn, Ga and Co, or the like.

There is no particular limitation on a substrate which can be used as the substrate 601 having an insulating surface. For example, a glass substrate, a quartz substrate, or the like which is used in a liquid crystal display device or the like can be used. Alternatively, a substrate in which an insulating layer is formed over a silicon wafer, or the like may be used.

The first gate electrode 602 can be formed using a metal material such as molybdenum, titanium, chromium, tantalum, tungsten, aluminum, copper, neodymium, or scandium or an alloy material which contains any of these materials as its main component. The first gate electrode 602 can have a single-layer structure or a stacked-layer structure.

Note that an insulating layer serving as a base may be provided between the substrate 601 and the first gate electrode 602. The insulating layer has the function of preventing diffusion of an impurity element from the substrate, and can be formed using one or more films of a silicon nitride film, a silicon oxide film, a silicon nitride oxide film, and a silicon oxynitride film.

The gate insulating layer 603 can be formed using one or more films of a silicon oxide film, a silicon nitride film, a silicon oxynitride film, a silicon nitride oxide film, an aluminum oxide film, an aluminum nitride film, an aluminum oxynitride film, an aluminum nitride oxide film, a hafnium oxide film, and the like by a plasma CVD method, a sputtering method, or the like. For example, the gate insulating layer 603 can be formed in such a manner that a silicon nitride film ($SiN_y$ (y>0)) with a thickness of 50 nm to 200 nm is formed as a first gate insulating layer by a plasma CVD method and a silicon oxide film ($SiO_x$ (x>0)) with a thickness of 5 nm to 300 nm is formed as a second gate insulating layer over the first gate insulating layer by a sputtering method. For example, the gate insulating layer 603 is formed to have a total thickness of 200 nm.

The source or drain electrode 605a and the source or drain electrode 605b can be formed using a metal material such as molybdenum, titanium, chromium, tantalum, tungsten, aluminum, copper, neodymium, or scandium or an alloy material which includes any of these materials as a main component. For example, the source or drain electrode 605a and the source or drain electrode 605b can have a stacked structure of a layer of a metal such as aluminum or copper and a layer of a high-melting-point metal such as titanium, molybdenum, or tungsten. An aluminum material including an element which prevents generation of hillocks or whiskers (e.g., silicon, neodymium, or scandium) may be used for higher heat resistance.

A conductive metal oxide film may be used as a conductive film to be the source or drain electrode 605a and the source or drain electrode 605b. As a conductive metal oxide, indium oxide ($In_2O_3$), tin oxide ($SnO_2$), zinc oxide (ZnO), indium oxide-tin oxide alloy ($In_2O_3$—$SnO_2$, which is abbreviated as ITO in some cases), indium oxide-zinc oxide alloy ($In_2O_3$—ZnO), any of these metal oxide materials in which silicon oxide is contained, or the like can be used.

As the insulating layer 606, an inorganic insulating film such as a silicon oxide film, a silicon oxynitride film, a gallium oxide film, an aluminum oxide film, or an aluminum oxynitride film can be typically used.

For the protective insulating layer 609, an inorganic insulating film such as a silicon nitride film, an aluminum nitride film, a silicon nitride oxide film, or an aluminum nitride oxide film can be used.

For the second gate electrode 607, a material similar to that of the source or drain electrode 605a and the source or drain electrode 605b can be used.

In addition, a planarization insulating film for reducing surface unevenness due to the transistor may be formed over the protective insulating layer 609 and the second gate electrode 607. As the planarization insulating film, an organic material such as polyimide, acrylic, or benzocyclobutene can be used. Other than such organic materials, it is also possible to use a low-dielectric constant material (a low-k material) or the like. Note that the planarization insulating film may be formed by stacking a plurality of insulating films formed with these materials.

Figure 4B:
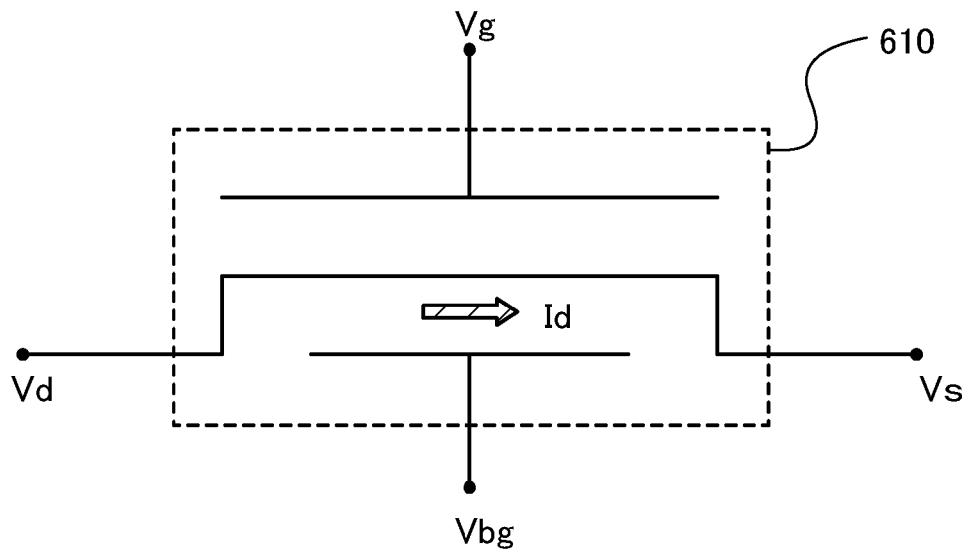

Next, FIG. 4B illustrates a transistor 610 with a circuit symbol of the transistor 600 illustrated in FIG. 4A. In FIG. 4B, Vd and Vs represent voltages applied to a drain electrode and a source electrode corresponding to the source or drain electrode 605a and the source or drain electrode 605b in FIG. 4A. Vg represents a voltage applied to the first gate electrode 602, and Vbg represents a voltage applied to the second gate electrode 607. Id represents a current which flows from the drain electrode to the source electrode.

It may be sufficient that each of the first gate electrode 602 and the second gate electrode 607 in FIG. 4A corresponds to either of the electrodes to which Vg and Vbg are applied in FIG. 4B, and the relation is not limited to one. For example, the first gate electrode 602 in FIG. 4A may correspond to the electrode to which Vbg is applied in FIG. 4B, and the second gate electrode 607 in FIG. 4A may correspond to the electrode to which Vg is applied in FIG. 4B.

A feature of the first transistor 501 and the second transistor 502 including an oxide semiconductor in the semiconductor layers is an extremely small off-state current. When the amplitude of the carrier wave or the amplitude-modulated wave received by the antenna 401 is low, i.e., when the distance between the semiconductor device and a wireless communication device is long, it is not preferable that the protection circuit 407 consumes power. With the use of the above-described transistors as the first transistor 501 and the second transistor 502, the loss of power at the protection circuit can be minimized when the amplitude of the carrier wave or the amplitude-modulated wave received by the antenna 401 is low.

Another feature of the first transistor 501 and the second transistor 502 including an oxide semiconductor in the semiconductor layers is high resistance of the protection circuit to electrical load and heat generation. It is generally assumed that the protection circuit is under a relatively high electrical load and generates heat. In a commonly used Si transistor, element heat generation may lead to progression of deterioration of characteristics, which may induce dielectric breakdown and cause a defect in the worst case. In this respect, the first transistor 501 and the second transistor 502 including an oxide semiconductor in the semiconductor layers have extremely high resistance to electrical load and heat generation. Thus, with the use of the first transistor 501 and the second transistor 502 including an oxide semiconductor in the semiconductor layers in the protection circuit 407, the resistance of the protection circuit 407 to electrical load and heat generation can be improved. Therefore, even when a signal with high amplitude is supplied from the antenna 401, the protection circuit 407 can operate normally and a highly reliable semiconductor device can be provided.

In this manner, the protection circuit described above is provided in the semiconductor device. Thus, it is possible to obtain a highly reliable semiconductor device because the protection circuit operates normally even when a signal with high amplitude is supplied to the semiconductor device and consumes little power even when the communication distance is long.

Embodiment 3

In this embodiment, a configuration in which circuits that can be used for an antenna, a rectifier circuit, and a protection circuit differ from those in Embodiments 1 and 2 is described with reference to FIGS. 5A and 5B.

A configuration of a protection circuit illustrated in FIGS. 5A and 5B is described in detail below.

FIG. 5A is a block diagram illustrating a configuration of a semiconductor device. The semiconductor device includes the following components: an antenna 701 which receives a carrier wave or an amplitude-modulated wave; a rectifier circuit 702 which generates an internal voltage Vin by rectifying the carrier wave or the amplitude-modulated wave; a demodulation circuit 703 which generates an internal signal by demodulating the carrier wave or the amplitude-modulated wave received by the antenna 701; a constant voltage circuit 704 which outputs as a power supply voltage Vdd a constant voltage obtained from the internal voltage Vin generated by the rectifier circuit 702; a logic circuit 705 which analyzes the power supply voltage Vdd generated by the constant voltage circuit 704 and a signal using the demodulated signal generated by the demodulation circuit 703 and generates a response signal; a modulation circuit 706 which outputs a modulated signal to the antenna 701 by modulating a signal from the logic circuit 705; a switching circuit 708 which controls a second gate electrode of a protection circuit 707 with a signal from the logic circuit 705 with reference to an output of the internal voltage Vin from the rectifier circuit 702; and the protection circuit 707 which cuts part of an excess of the amplitude of the carrier wave or the amplitude-modulated wave received by the antenna 701 when the amplitude of the wave is higher than a limit voltage Vlim and which refers to the internal voltage Vin from the rectifier circuit 702 and suppresses an increase in the internal voltage Vin.

Configurations of the switching circuit 708 and the protection circuit 707 are described below with reference to FIG. 5B.

The protection circuit 707 illustrated in FIG. 5B includes a first terminal, a second terminal, and a third terminal. Note that the first terminal is electrically connected to the antenna 701, and the second terminal is grounded. The third terminal of the protection circuit 707 is connected to a source electrode of a transistor 803 provided in the switching circuit 708.

The protection circuit 707 includes a first transistor 801 having a drain electrode and a first gate electrode each electrically connected to the antenna, a source electrode grounded, and a second gate electrode electrically connected to an output of the switching circuit 708 and a second transistor 802 having a source electrode electrically connected to the antenna, a drain electrode and a first gate electrode each grounded, and a second gate electrode electrically connected to the output of the switching circuit 708.

A drain electrode of the transistor 803 provided in the switching circuit 708 is electrically connected to an output terminal of the rectifier circuit 702. A gate electrode of the transistor 803 provided in the switching circuit 708 is electrically connected to the logic circuit 705. In other words, the logic circuit 705 can hold the second gate electrodes of the first transistor 801 and the second transistor 802 at a given potential through the transistor 803 provided in the switching circuit 708.

In FIG. 5B, two rows of first transistors 801, three in each row, which are connected in series, and two rows of second transistors 802, three in each row, which are connected in series, are connected in parallel; however, the configuration of the protection circuit 707 is not limited to this configuration. The protection circuit 707 may have a configuration in which one or more first transistors 801 and one or more second transistors 802 are provided and the one or more first transistors 801 and the one or more second transistors 802 are connected in parallel. Note that the connection between the first transistors 801 and the connection between the second transistors 802 are not limited to serial connection or parallel connection, and the first transistors 801 and the second transistors 802 may be connected in a given way.

Furthermore, the first transistor 801, the second transistor 802, and the third transistor 803 include oxide semiconductor layers as the semiconductor layers. As the first transistor 801 and the second transistor 802, transistors having a structure similar to that of the transistor 600 described in Embodiment 2 can be used. As the transistor 803, a transistor having a structure similar to that of the transistor 300 described in Embodiment 1 can be used. Thus, the description of the first transistor 801, the second transistor 802, and the third transistor 803 is omitted in this embodiment.

The drain electrode of the transistor 803 provided in the switching circuit 708 is electrically connected to the output terminal of the rectifier circuit 702, and the source electrode of the transistor 803 is connected to the second gate electrodes of the first transistor 801 and the second transistor 802 provided in the protection circuit 707. Therefore, when the amplitude of the carrier wave or the amplitude-modulated wave input to the rectifier circuit 702 is equal to or greater than a certain value, the potential of the second gate electrodes in the protection circuit 707 can be held at a given potential by the logic circuit 705 controlling the transistor 803 in the switching circuit 708. By holding the second gate electrodes at a given potential, the threshold voltage of the transistors in the protection circuit 707 can be controlled, the amount of power consumed by the protection circuit 707 can be controlled, and the load on the rectifier circuit 702 and the constant voltage circuit 704 in the subsequent stage can be reduced.

In this manner, the protection circuit 707 described above is provided in the semiconductor device. Thus, it is possible to obtain a highly reliable semiconductor device because the protection circuit operates normally even when a signal with high amplitude is supplied to the semiconductor device and consumes little power when the communication distance is long.

Embodiment 4

In this embodiment, a configuration in which a circuit that can be used for a protection circuit differs from those in the above embodiments will be described with reference to FIG. 6.

FIGS. 1A, 3A, and 5A each illustrate the block diagram of the configuration of the semiconductor device (RFID), in which a clock signal CLK necessary for operation of the logic circuit 105, the logic circuit 405, or the logic circuit 705 is generated by processing a carrier wave or an amplitude-modulated wave received by the antenna with the use of circuits included in the logic circuit as appropriate. On the other hand, when the clock signal CLK necessary for operation of the logic circuit is generated without reference to the carrier wave or the amplitude-modulated wave received by the antenna, the semiconductor device (the RFID) may additionally include a clock generation circuit. In particular, a long-range RFID for performing communication with a reader/writer within the band of frequencies ranging from 300 MHz to 3 GHz (within the UHF band) preferably includes a clock generation circuit.

Figure 6:
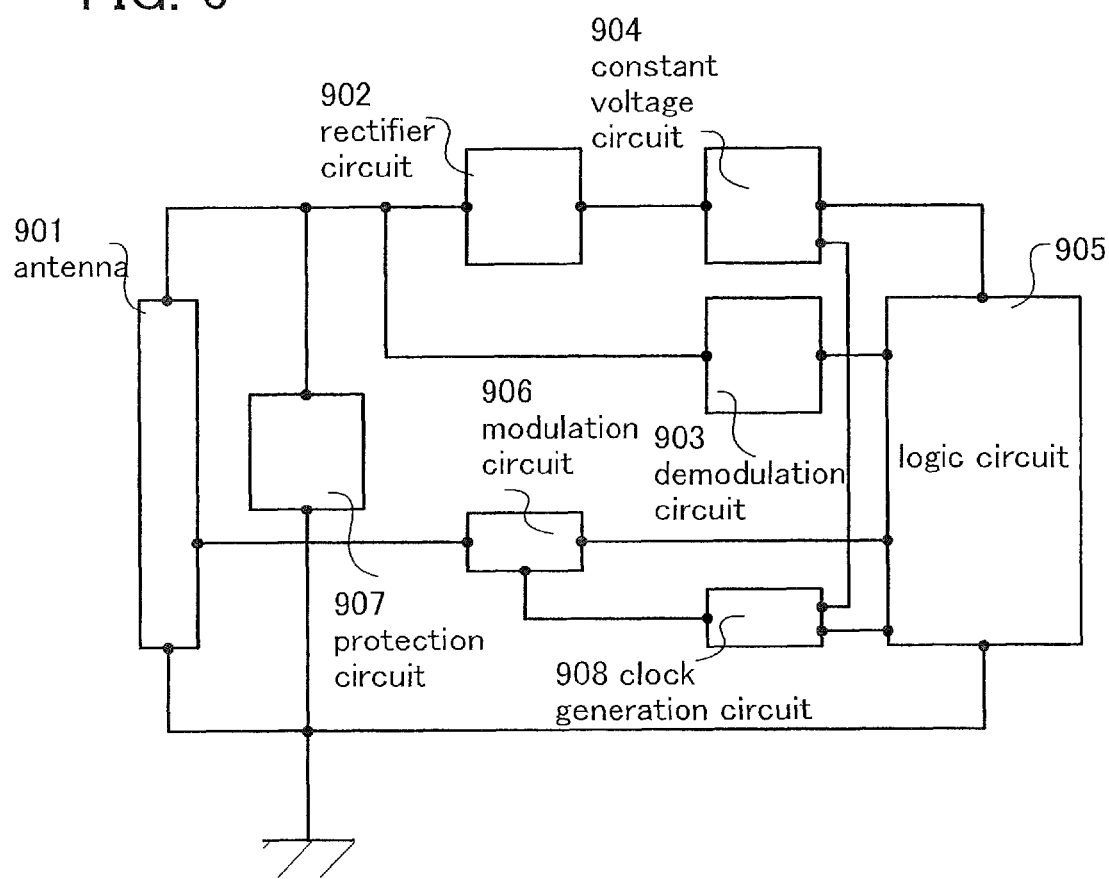
FIG. 6 is a block diagram illustrating a whole RFID according to one embodiment of the present invention.

In this embodiment, FIG. 6 illustrates a block diagram of a configuration of a semiconductor device including a clock generation circuit.

The semiconductor device includes the following components: an antenna 901 which receives a carrier wave or an amplitude-modulated wave; a rectifier circuit 902 which generates an internal voltage Vin by rectifying the carrier wave or the amplitude-modulated wave received by the antenna 901; a demodulation circuit 903 which generates an internal signal by demodulating the carrier wave or the amplitude-modulated wave received by the antenna 901; a constant voltage circuit 904 which outputs as a power supply voltage Vdd a constant voltage obtained from the internal voltage Vin generated by the rectifier circuit 902; a logic circuit 905 which analyzes the power supply voltage Vdd generated by the constant voltage circuit 904 and a signal using the demodulated signal generated by the demodulation circuit 903 and generates a response signal; a modulation circuit 906 which outputs a modulated signal to the antenna 901 by modulating a signal from the logic circuit 905; a clock generation circuit 908 which generates a clock signal CLK necessary for operation of the logic circuit 905; and a protection circuit 907 which operates when the amplitude of an AC voltage generated by the antenna 901 is high and which cuts part of an excess of the amplitude of the carrier wave or the amplitude-modulated wave received by the antenna 901 when the amplitude of the wave is higher than a limit voltage Vlim.

The clock generation circuit 908 needs to have the function of stably supplying a clock signal CLK having a constant frequency to the logic circuit 905. Therefore, a constant potential needs to be supplied to the clock generation circuit 908.

As a constant potential supplied to the clock generation circuit 908, the power supply potential Vdd generated by the constant voltage circuit 904 may be used. However, the power supply potential Vdd is also supplied to other circuits and it may change depending on the operation of the other circuits. In that case, it is preferable that another power supply potential Vdd_CLK which is different from the power supply potential Vdd supplied to the other circuits be generated by the constant voltage circuit 904 and the power supply potential Vdd_CLK be supplied to the clock generation circuit 908. By employing this configuration, the clock generation circuit 908 can easily and stably supply a clock signal CLK having a constant frequency to the logic circuit 905.

Note that as the circuits other than the clock generation circuit 908 in the block diagram of the semiconductor device illustrated in FIG. 6, circuits similar to those in the configuration illustrated in FIG. 1A can be used, and the protection circuit 907 can have a similar circuit configuration and similar transistors. Thus, the description is omitted here.

The protection circuit 907 operates when the amplitude of the carrier wave or the amplitude-modulated wave received by the antenna 901 is high. In other words, when the amplitude of the carrier wave or the amplitude-modulated wave input to the rectifier circuit 902 is equal to or greater than a certain value, transistors provided in the protection circuit 907 operate. Part of an excessive carrier wave or amplitude-modulated wave received by the antenna 901 is consumed by the protection circuit 907 and the load on the rectifier circuit 902 and the demodulation circuit 903 in the subsequent stage is reduced.

In this manner, the protection circuit 907 described above is provided in the semiconductor device. Thus, it is possible to obtain a highly reliable semiconductor device because the protection circuit operates normally even when a signal with high amplitude is supplied to the semiconductor device and consumes little power even when the communication distance is long.

This embodiment can be implemented in appropriate combinations with the configurations described in the other embodiments.

Embodiment 5

In this embodiment, transistors which are different from the transistors including oxide semiconductor layers, which are described in Embodiments 1 to 4, will be described with reference to FIGS. 7A to 7C. Note that there is no particular limitation on the structure of transistors. For example, a staggered type or a planar type having a top-gate structure or a bottom-gate structure can be employed as appropriate. Further, the transistor may have a single gate structure including one channel formation region or a multi-gate structure such as a double gate structure including two channel formation regions or a triple gate structure including three channel formation regions. Alternatively, the transistor may have a dual gate structure including two gate electrodes positioned above and below a channel region with gate insulating layers provided therebetween. Note that portions described below are denoted by the same reference numerals in different drawings, and the description thereof will not be repeated.

Figure 7A:
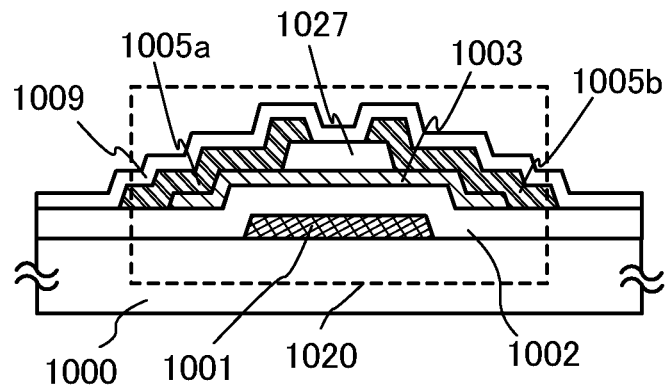
FIGS. 7A to 7C are cross-sectional views each illustrating an example of a transistor according to one embodiment of the present invention.
Figure 7B:
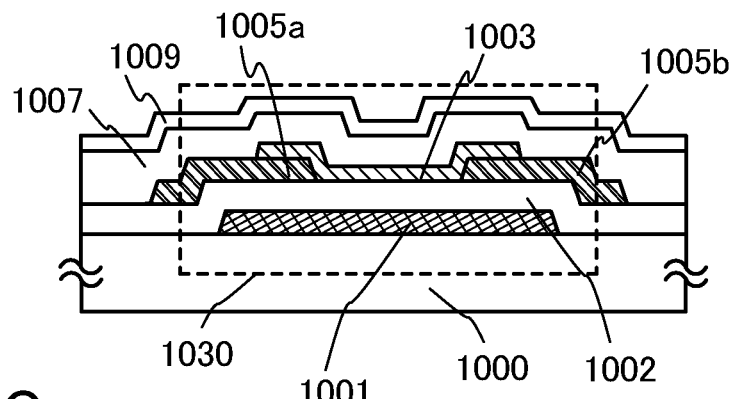
Figure 7C:
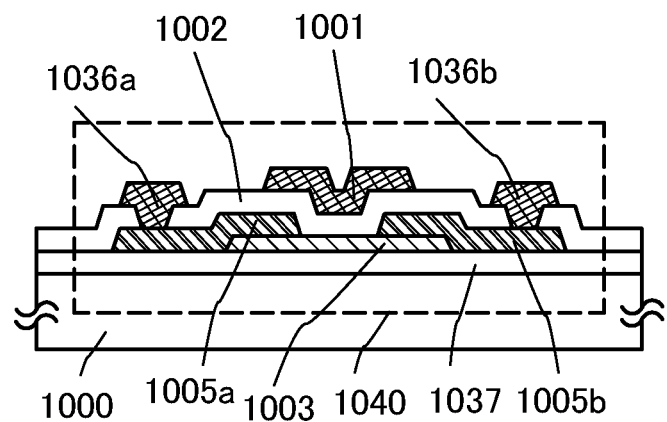

FIGS. 7A to 7C each illustrate an example of a cross-sectional structure of a transistor. Transistors illustrated in FIGS. 7A to 7C include an oxide semiconductor as a semiconductor. An advantage of using an oxide semiconductor is that a high mobility and a small off-state current can be obtained with a simple and low-temperature process.

A transistor 1020 illustrated in FIG. 7A is an example of bottom-gate transistors called a channel-protective (channel-stop) transistor and is also called an inverted staggered transistor.

The transistor 1020 includes, over a substrate 1000 having an insulating surface, a gate electrode 1001, a gate insulating layer 1002, an oxide semiconductor layer 1003, an insulating layer 1027 which functions as a channel protective layer, a source or drain electrode 1005a, and a source or drain electrode 1005b. Further, a protective insulating layer 1009 is formed so as to cover the transistor 1020.

A transistor 1030 illustrated in FIG. 7B is an example of bottom-gate transistors. The transistor 1030 includes, over the substrate 1000 having an insulating surface, the gate electrode 1001, the gate insulating layer 1002, the source or drain electrode 1005a, the source or drain electrode 1005b, and the oxide semiconductor layer 1003. Further, an insulating layer 1007 being in contact with the oxide semiconductor layer 1003 is provided so as to cover the transistor 1030. The protective insulating layer 1009 is further formed over the insulating layer 1007.

In the transistor 1030, the gate insulating layer 1002 is provided above and in contact with the substrate 1000 and the gate electrode 1001; the source or drain electrode 1005a and the source or drain electrode 1005b are provided above and in contact with the gate insulating layer 1002. In addition, the oxide semiconductor layer 1003 is provided over the gate insulating layer 1002, the source or drain electrode 1005a, and the source or drain electrode 1005b.

A transistor 1040 illustrated in FIG. 7C is an example of top-gate transistors. The transistor 1040 includes, over the substrate 1000 having an insulating surface, an insulating layer 1037, the oxide semiconductor layer 1003, the source or drain electrode 1005a, the source or drain electrode 1005b, the gate insulating layer 1002, and the gate electrode 1001. A wiring 1036a and a wiring 1036b are provided in contact with the source or drain electrode 1005a and the source or drain electrode 1005b, respectively.

In this embodiment, the oxide semiconductor layer 1003 is used as a semiconductor layer. The oxide semiconductor layer 1003 can be formed using an oxide semiconductor, for example, a four-component metal oxide such as an In—Sn—Ga—Zn—O-based oxide semiconductor, a three-component metal oxide such as an In—Ga—Zn—O-based oxide semiconductor, an In—Sn—Zn—O-based oxide semiconductor, an In—Hf—Zn—O-based oxide semiconductor, an In—Al—Zn—O-based oxide semiconductor, a Sn—Ga—Zn—O-based oxide semiconductor, an Al—Ga—Zn—O-based oxide semiconductor, or a Sn—Al—Zn—O-based oxide semiconductor, a two-component metal oxide such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, or an In—Mg—O-based oxide semiconductor, an In—O-based oxide semiconductor, a Sn—O-based oxide semiconductor, or a Zn—O-based oxide semiconductor. Further, $SiO_2$ may be added to the above-described oxide semiconductor. Here, for example, the In—Ga—Zn—O-based oxide semiconductor means an oxide containing at least In, Ga, and Zn, and there is no limitation on the composition ratio thereof. In addition, the oxide semiconductor may contain an element other than In, Ga, and Zn.

For the oxide semiconductor layer 1003, an oxide semiconductor represented by the chemical formula, $InMO_3(ZnO)_m$ (m>0) can be used. Here, M represents one or more metal elements selected from Sn, Hf, Ga, Al, Mn, and Co. For example, M may be Ga, Ga and Al, Ga and Mn, Ga and Co, or the like.

A feature of the transistor 1020, the transistor 1030, and the transistor 1040 each including the oxide semiconductor layer 1003 is an extremely small off-state current. Therefore, with the use of any of the above-described transistors in a protection circuit, the loss of power at the protection circuit can be minimized when the amplitude of a carrier wave or an amplitude-modulated wave received by an antenna is low.

There is no particular limitation on a substrate which can be used as the substrate 1000 having an insulating surface. For example, a glass substrate, a quartz substrate, or the like which is used in a liquid crystal display device or the like can be used. Alternatively, a substrate in which an insulating layer is formed over a silicon wafer, or the like may be used.

In the transistor 1020 or the transistor 1030 which is a bottom-gate transistor, an insulating layer serving as a base may be provided between the substrate and the gate electrode. The insulating layer has the function of preventing diffusion of an impurity element from the substrate, and can be formed using one or more films of a silicon nitride film, a silicon oxide film, a silicon nitride oxide film, and a silicon oxynitride film.

The gate electrode 1001 can be formed using a metal material such as molybdenum, titanium, chromium, tantalum, tungsten, aluminum, copper, neodymium, or scandium or an alloy material which contains any of these materials as its main component. The gate electrode 1001 can have a single-layer structure or a stacked-layer structure.

The gate insulating layer 1002 can be formed using one or more films of a silicon oxide film, a silicon nitride film, a silicon oxynitride film, a silicon nitride oxide film, an aluminum oxide film, an aluminum nitride film, an aluminum oxynitride film, an aluminum nitride oxide film, a hafnium oxide film, and the like by a plasma CVD method, a sputtering method, or the like. For example, the gate insulating layer 1002 can be formed in such a manner that a silicon nitride film ($SiN_y$ (y>0)) with a thickness of 50 nm to 200 nm is formed as a first gate insulating layer by a plasma CVD method and a silicon oxide film ($SiO_x$ (x>0)) with a thickness of 5 nm to 300 nm is formed as a second gate insulating layer over the first gate insulating layer by a sputtering method. For example, the gate insulating layer 1002 is formed to have a total thickness of 200 nm.

The source or drain electrode 1005a and the source or drain electrode 1005b can be formed using a metal material such as molybdenum, titanium, chromium, tantalum, tungsten, aluminum, copper, neodymium, or scandium or an alloy material which includes any of these materials as a main component. For example, the source or drain electrode 1005a and the source or drain electrode 1005b can have a stacked structure of a layer of a metal such as aluminum or copper and a layer of a high-melting-point metal such as titanium, molybdenum, or tungsten. An aluminum material including an element which prevents generation of hillocks or whiskers (e.g., silicon, neodymium, or scandium) may be used for higher heat resistance.

A conductive metal oxide film may be used as a conductive film to be the source or drain electrode 1005a and the source or drain electrode 1005b (including a wiring formed using the same layer as these electrodes). As a conductive metal oxide, indium oxide ($In_2O_3$), tin oxide ($SnO_2$), zinc oxide (ZnO), indium oxide-tin oxide alloy ($In_2O_3$—$SnO_2$, which is abbreviated as ITO in some cases), indium oxide-zinc oxide alloy ($In_2O_3$—ZnO), any of these metal oxide materials in which silicon oxide is contained, or the like can be used.

The wiring 1036a and the wiring 1036b which are in contact with the source or drain electrode 1005a and the source or drain electrode 1005b can be formed using a material similar to that of the source or drain electrode 1005a and the source or drain electrode 1005b.

As the insulating layer 1007, the insulating layer 1027, and the insulating layer 1037, an inorganic insulating film such as a silicon oxide film, a silicon oxynitride film, a gallium oxide film, an aluminum oxide film, or an aluminum oxynitride film can be typically used.

For the protective insulating layer 1009, an inorganic insulating film such as a silicon nitride film, an aluminum nitride film, a silicon nitride oxide film, or an aluminum nitride oxide film can be used.

In addition, a planarization insulating film for reducing surface unevenness due to the transistor may be formed over the protective insulating layer 1009. As the planarization insulating film, an organic material such as polyimide, acrylic, or benzocyclobutene can be used. Other than such organic materials, it is also possible to use a low-dielectric constant material (a low-k material) or the like. Note that the planarization insulating film may be formed by stacking a plurality of insulating films formed with these materials.

The configurations, methods, and the like described in this embodiment can be combined as appropriate with any of the configurations, methods, and the like described in the other embodiments.

Embodiment 6

In this embodiment, an example of a method for manufacturing the transistor including an oxide semiconductor layer, which is described in Embodiment 1 and illustrated in FIG. 2, will be described in detail with reference to FIGS. 8A to 8E.

FIGS. 8A to 8E are cross-sectional views illustrating a manufacturing process of a transistor. Note that a transistor 1110 described herein is an inverted staggered transistor. Note that the transistor 1110 has the same structure as the transistor 300 described in Embodiment 1 and illustrated in FIG. 2.

An oxide semiconductor used for a semiconductor layer of this embodiment is an i-type (intrinsic) oxide semiconductor or a substantially i-type (intrinsic) oxide semiconductor. The i-type (intrinsic) oxide semiconductor or substantially i-type (intrinsic) oxide semiconductor is obtained by purification in such a manner that hydrogen, which is an n-type impurity, is removed from an oxide semiconductor, the oxide semiconductor is made to contain as few impurities that are not main components of the oxide semiconductor as possible, and oxygen defects in the oxide semiconductor are reduced by supplying oxygen to the oxide semiconductor.

Note that the purified oxide semiconductor includes extremely few carriers, and the carrier concentration is lower than $1\times10^{14}/cm^3$, preferably lower than $1\times10^{12}/cm^3$, further preferably lower than $1\times10^{11}/cm^3$. Such few carriers enable a current in an off state (off-state current) to be small enough.

Specifically, in the transistor including the above-described oxide semiconductor layer, the off-state current density per channel width of 1 μm at room temperature (25 °C.) can be 100 zA/μm ($1\times10^{-19}$ A/μm) or less, or further 10 zA/μm ($1\times10^{-20}$ A/μm) or less.

The transistor 1110 including the purified oxide semiconductor layer hardly has temperature dependence of an on-state current and also has an extremely small off-state current even under a high temperature condition.

A process for manufacturing the transistor 1110 over a substrate 1105 is described with reference to FIGS. 8A to 8E.

First, a conductive layer is formed over the substrate 1105 having an insulating surface, and then, a gate electrode 1111 is formed in a first photolithography step. Note that a resist mask used in the photolithography step may be formed by an inkjet method. Formation of the resist mask by an inkjet method requires no photomask; thus, manufacturing cost can be reduced.

As the substrate 1105 having an insulating surface, a substrate which is similar to the substrate 1000 described in the above embodiment can be used. In this embodiment, a glass substrate is used as the substrate 1105.

Note that an insulating layer serving as a base may be provided between the substrate 1105 and the gate electrode 1111. The insulating layer has the function of preventing diffusion of an impurity element from the substrate 1105, and can be formed using one or more films of a silicon nitride film, a silicon oxide film, a silicon nitride oxide film, and a silicon oxynitride film.

The gate electrode 1111 can be formed using a metal material such as molybdenum, titanium, chromium, tantalum, tungsten, aluminum, copper, neodymium, or scandium or an alloy material which contains any of these materials as its main component. The gate electrode 1111 can have a single-layer structure or a stacked-layer structure.

Next, a gate insulating layer 1107 is formed over the gate electrode 1111. The gate insulating layer 1107 can be formed by a plasma CVD method, a sputtering method, or the like. The gate insulating layer 1107 can be formed using one or more films of a silicon oxide film, a silicon nitride film, a silicon oxynitride film, a silicon nitride oxide film, an aluminum oxide film, an aluminum nitride film, an aluminum oxynitride film, an aluminum nitride oxide film, a hafnium oxide film, and the like.

In order that the gate insulating layer 1107 and an oxide semiconductor layer 1130 contain as little hydrogen, hydroxyl group, and moisture as possible, it is preferable that an impurity adsorbed on the substrate 1105, such as moisture or hydrogen, be desorbed by preheating the substrate 1105 which has been subjected to the process up to and including the step of forming the gate electrode 1111 or the step of forming the gate insulating layer 1107, in a preheating chamber of a sputtering apparatus, as a pretreatment for film formation of the oxide semiconductor layer 1130. As an exhaustion unit provided in the preheating chamber, a cryopump is preferably employed. Alternatively, this preheating step may be performed on the substrate 1105 which has been subjected to the process up to and including the step of forming a source or drain electrode 1115a and a source or drain electrode 1115b. Note that this preheating treatment can be omitted.

Figure 8A:
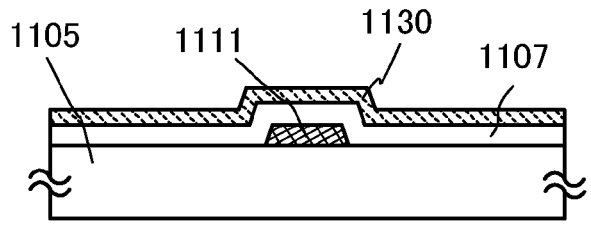
FIGS. 8A to 8E are cross-sectional views illustrating an example of a transistor according to one embodiment of the present invention.

Next, the oxide semiconductor layer 1130 having a thickness of 2 nm to 200 nm, preferably 5 nm to 30 nm, is formed over the gate insulating layer 1107 (see FIG. 8A).

For the oxide semiconductor layer 1130, any of the four-component metal oxide, the three-component metal oxides, the two-component metal oxides, an In—O-based oxide semiconductor, a Sn—O-based oxide semiconductor, a Zn—O-based oxide semiconductor, and the like, which are described above in Embodiment 5, can be used.

As a target used to form the oxide semiconductor layer 1130 by a sputtering method, a target of a metal oxide containing zinc oxide as a main component can be used. As another example of a target of a metal oxide, a metal oxide target containing In, Ga, and Zn (in a composition ratio, $In_2O_3:Ga_2O_3:ZnO=1:1:1$ [molar ratio]) can be used. Alternatively, as a metal oxide target containing In, Ga, and Zn, a target having a composition ratio of $In_2O_3:Ga_2O_3:ZnO=2:2:1$ [molar ratio] or $In_2O_3:Ga_2O_3:ZnO=1:1:4$ [molar ratio] can be used. The filling rate of the metal oxide target is 90% to 100%, preferably 95% to 99.9%. With the use of the metal oxide target with high fill rate, a dense oxide semiconductor film can be formed.

The atmosphere in which the oxide semiconductor layer 1130 is formed is preferably a rare gas (typically, argon) atmosphere, an oxygen atmosphere, or a mixed atmosphere containing a rare gas (typically, argon) and oxygen. Specifically, it is preferable to use a high-purity gas atmosphere, for example, from which an impurity such as hydrogen, water, a hydroxyl group, or hydride is removed to a concentration of 1 ppm or less (preferably, a concentration of 10 ppb or less).

In forming the oxide semiconductor layer 1130, for example, an object to be processed is held in a treatment chamber that is maintained under reduced pressure, and the object to be processed is heated to a temperature higher than or equal to 100° C. and lower than 550° C., preferably higher than or equal to 200° C. and lower than or equal to 450° C. Alternatively, the temperature of an object to be processed in forming the oxide semiconductor layer 1130 may be room temperature (25° C. ±10° C.). Then, moisture in the treatment chamber is removed, a sputtering gas from which hydrogen, water, or the like is removed is introduced, and the above-described target is used; thus, the oxide semiconductor layer 1130 is formed. By forming the oxide semiconductor layer 1130 while heating the object to be processed, an impurity in the oxide semiconductor layer 1130 can be reduced. Moreover, damage due to sputtering can be reduced. In order to remove the moisture from the treatment chamber, it is preferable to use an entrapment vacuum pump. For example, a cryopump, an ion pump, a titanium sublimation pump, or the like can be used. A turbomolecular pump provided with a cold trap may be used. Since hydrogen, water, or the like can be removed from the treatment chamber by evacuation with a cryopump or the like, the concentration of an impurity in the oxide semiconductor layer 1130 can be reduced.

For example, conditions for forming the oxide semiconductor layer 1130 can be set as follows: the distance between the object to be processed and the target is 170 mm; the pressure is 0.4 Pa; the direct current (DC) power is 0.5 kW; and the atmosphere is an oxygen (100% oxygen) atmosphere, an argon (100% argon) atmosphere, or a mixed atmosphere of oxygen and argon. Note that a pulsed direct current (DC) power source is preferably used because dust (such as powder substances generated in film formation) can be reduced and the film thickness can be made uniform. The thickness of the oxide semiconductor layer 1130 is set in the range of 1 nm to 50 nm, preferably 1 nm to 30 nm. With the use of the oxide semiconductor layer 1130 having such a thickness, a short-channel effect due to miniaturization can be suppressed. Note that the appropriate thickness of the oxide semiconductor layer differs depending on the oxide semiconductor material to be used, the intended use of the semiconductor device, or the like; therefore, the thickness can be determined as appropriate in accordance with the material, the intended use, or the like.

Note that before the oxide semiconductor layer 1130 is formed by a sputtering method, reverse sputtering in which plasma is generated with an argon gas introduced is preferably performed so that a material attached to a formation surface (e.g., a surface of the gate insulating layer 1107) is removed. Here, the reverse sputtering is a method in which ions collide with a surface to be processed so that the surface is modified. An example of a method for making ions collide with a surface to be processed is a method in which high-frequency voltage is applied to the surface side in an argon atmosphere so that plasma is generated near the object to be processed. Note that an atmosphere of nitrogen, helium, oxygen, or the like may be used instead of an argon atmosphere.

Next, the oxide semiconductor layer 1130 is processed into an oxide semiconductor layer having an island shape in a second photolithography step. Note that a resist mask used in the photolithography step may be formed by an inkjet method. Formation of the resist mask by an inkjet method requires no photomask; thus, manufacturing cost can be reduced.

In the case where a contact hole is formed in the gate insulating layer 1107, a step thereof can be performed at the same time as processing the oxide semiconductor layer 1130.

Note that the etching of the oxide semiconductor layer 1130 may be dry etching, wet etching, or both dry etching and wet etching. An example of an etchant which can be used for wet etching of the oxide semiconductor layer 1130 is a mixed solution of phosphoric acid, acetic acid, and nitric acid, an ammonia hydrogen peroxide mixture (hydrogen peroxide solution of 31 wt %:ammonia solution of 28 wt %:water=5:2:2), or the like. In addition, ITO-07N (produced by KANTO CHEMICAL CO., INC.) may be used.

Figure 8B:
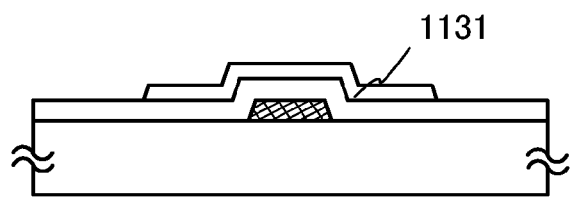

Then, heat treatment (first heat treatment) is performed on the oxide semiconductor layer; thus, an oxide semiconductor layer 1131 is obtained (see FIG. 8B). Through the first heat treatment, excess hydrogen (including water or a hydroxyl group) in the oxide semiconductor layer can be removed, the structure of the oxide semiconductor layer can be ordered, and defect states in an energy gap can be reduced. For example, the temperature of the first heat treatment can be set higher than or equal to 300° C. and lower than 650° C., preferably higher than or equal to 400° C. and lower than or equal to 500° C.

For example, after an object to be processed is introduced into an electric furnace including a resistance heater or the like, the heat treatment can be performed at 450° C. for one hour in a nitrogen atmosphere. The oxide semiconductor layer is not exposed to the air during the heat treatment so that entry of water or hydrogen can be prevented.

The heat treatment apparatus is not limited to the electric furnace and may be an apparatus for heating an object to be processed by thermal radiation or thermal conduction from a medium such as a heated gas. For example, a rapid thermal annealing (RTA) apparatus such as a gas rapid thermal annealing (GRTA) apparatus or a lamp rapid thermal annealing (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for performing heat treatment using a high-temperature gas. As the gas, an inert gas that does not react with an object to be processed by heat treatment, for example, nitrogen or a rare gas such as argon is used.

For example, as the first heat treatment, GRTA treatment may be performed as follows. The object to be processed is put in a heated inert gas atmosphere, heated for several minutes, and taken out of the inert gas atmosphere. The GRTA treatment enables high-temperature heat treatment in a short time. Moreover, the GRTA treatment can be employed even when the temperature exceeds the upper temperature limit of the object to be processed. Note that the inert gas may be switched to a gas including oxygen during the treatment. This is because defect states in an energy gap caused by oxygen deficiency can be reduced by performing the first heat treatment in an atmosphere including oxygen.

Note that as the inert gas atmosphere, an atmosphere that contains nitrogen or a rare gas (e.g., helium, neon, or argon) as its main component and does not contain water, hydrogen, or the like is preferably used. For example, the purity of nitrogen or a rare gas such as helium, neon, or argon introduced into a heat treatment apparatus is set to 6N (99.9999%) or more, preferably 7N (99.99999%) or more (i.e., the impurity concentration is 1 ppm or less, preferably 0.1 ppm or less).

In any case, by reducing impurities such as water or hydrogen in the oxide semiconductor layer through the first heat treatment, a transistor having highly excellent characteristics can be realized.

The above heat treatment (the first heat treatment) can also be referred to as dehydration treatment, dehydrogenation treatment, or the like because it has the effect of removing hydrogen, water, or the like. The dehydration treatment or the dehydrogenation treatment may be performed after the oxide semiconductor layer 1130 is formed and before the oxide semiconductor layer 1130 is processed into an oxide semiconductor layer having an island shape. Such dehydration treatment or dehydrogenation treatment may be conducted once or plural times.

Other than the above timing, the first heat treatment can be performed at the following timing: after formation of a source electrode and a drain electrode, after formation of the insulating layer over the source electrode and the drain electrode, or the like.

Further, an oxide semiconductor layer formed in the following manner may also be used: an oxide semiconductor is deposited twice, and heat treatment is performed thereon twice. Through such steps, a crystal region (a single crystal region) which is c-axis-aligned perpendicularly to a surface of the film and has a large thickness can be formed without depending on a base component.

For example, a first oxide semiconductor layer with a thickness of 3 nm to 15 nm is deposited, and first heat treatment is performed in a nitrogen atmosphere, an oxygen atmosphere, a rare gas atmosphere, or a dry air atmosphere at a temperature higher than or equal to 450° C. and lower than or equal to 850° C., preferably higher than or equal to 550° C. and lower than or equal to 750° C., so that a first oxide semiconductor layer having a crystal region (including a plate-like crystal) in a region including a surface is formed. Then, a second oxide semiconductor layer which has a larger thickness than the first oxide semiconductor layer is formed, and second heat treatment is performed at a temperature higher than or equal to 450° C. and lower than or equal to 850° C., preferably higher than or equal to 600° C. and lower than or equal to 700° C.

Through such steps, in the entire second oxide semiconductor layer, crystal growth can proceed from the lower part to the upper part using the first oxide semiconductor layer as a seed crystal, whereby an oxide semiconductor layer having a thick crystal region can be formed.

Next, a conductive film to be the source or drain electrodes is formed over the gate insulating layer 1107 and the oxide semiconductor layer 1131. The conductive film to be the source or drain electrodes can be formed using a metal material such as molybdenum, titanium, chromium, tantalum, tungsten, aluminum, copper, neodymium, or scandium or an alloy material which includes any of these materials as a main component. For example, the conductive film can have a stacked structure of a layer of a metal such as aluminum or copper and a layer of a high-melting-point metal such as titanium, molybdenum, or tungsten. An aluminum material including an element which prevents generation of hillocks or whiskers (e.g., silicon, neodymium, or scandium) may be used for higher heat resistance.

A conductive metal oxide film may be used as the conductive film to be the source or drain electrodes. As a conductive metal oxide, indium oxide ($In_2O_3$), tin oxide ($SnO_2$), zinc oxide (ZnO), indium oxide-tin oxide alloy ($In_2O_3$—$SnO_2$, which is abbreviated as ITO in some cases), indium oxide-zinc oxide alloy ($In_2O_3$—ZnO), any of these metal oxide materials in which silicon oxide is contained, or the like can be used.

Figure 8C:
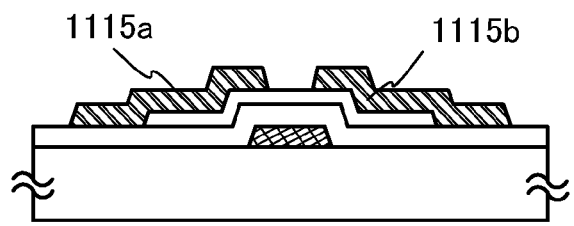

Next, a resist mask is formed over the conductive film by a third photolithography step, and the source or drain electrode 1115a and the source or drain electrode 1115b are formed by selective etching, and then, the resist mask is removed (see FIG. 8C).

Light exposure at the time of the formation of the resist mask in the third photolithography step may be performed using ultraviolet light, KrF laser light, or ArF laser light. Note that the channel length (L) of the transistor is determined by the distance between the source or drain electrodes. Therefore, in light exposure for forming a mask that is used for forming a transistor with a channel length (L) of less than 25 nm, it is preferable to use extreme ultraviolet light whose wavelength is as short as several nanometers to several tens of nanometers. The resolution of light exposure with extreme ultraviolet rays is high and the focal depth is large. For these reasons, the channel length (L) of the transistor to be formed later can be set to 10 nm to 1000 nm (1 μm), in which case the circuit can operate at higher speed. In addition, power consumption of the semiconductor device can be reduced by miniaturization.

In order to reduce the number of photomasks used in photolithograph steps and the number of steps, etching may be performed with the use of a resist mask formed using a multi-tone mask which is a light-exposure mask. A resist mask formed with the use of a multi-tone mask includes regions with different thicknesses and further can be changed in shape by etching; therefore, the resist mask can be used in a plurality of etching steps for processing into different patterns. Therefore, a resist mask corresponding to at least two kinds of different patterns can be formed by using one multi-tone mask. Thus, the number of light-exposure masks can be reduced and the number of corresponding photolithography steps can also be reduced, whereby simplification of the manufacturing process can be realized.

Note that it is preferable that etching conditions be optimized so as not to divide the oxide semiconductor layer 1131 when the conductive film is etched. However, it is difficult to obtain conditions under which only the conductive film is etched and the oxide semiconductor layer 1131 is not etched at all. Therefore, in some cases, part of the oxide semiconductor layer 1131 is etched and a groove (a depressed portion) is formed at the time of etching of the conductive film.

The conductive film may be etched by either wet etching or dry etching. Note that dry etching is preferably used in terms of element miniaturization. An etching gas or an etchant can be selected as appropriate depending on a material to be etched. In this embodiment, a titanium film is used as the conductive film and an In—Ga—Zn—O-based material is used for the oxide semiconductor layer 1131; when wet etching is employed, an ammonia peroxide mixture (31 wt % hydrogen peroxide solution:28 wt % ammonia water:water=5:2:2) can be used as an etchant, for example.

Next, plasma treatment using a gas such as $N_2O$, $N_2$, or Ar is preferably performed to remove hydrogen, water, or the like attached to an exposed surface of the oxide semiconductor layer. In the case where the plasma treatment is performed, an insulating layer 1116 serving as a protective insulating layer is formed without exposure of the oxide semiconductor layer to the air.

The insulating layer 1116 is preferably formed to a thickness of at least 1 nm by a method by which an impurity such as water or hydrogen does not enter the insulating layer 1116, such as a sputtering method. This is because when hydrogen is contained in the insulating layer 1116, entry of the hydrogen into the oxide semiconductor layer, extraction of oxygen from the oxide semiconductor layer by hydrogen, or the like may occur, in which case the backchannel of the oxide semiconductor layer may have lower resistance (become n-type) and a parasitic channel may be formed. As the insulating layer 1116, a silicon oxide film, a silicon oxynitride film, an aluminum oxide film, an aluminum oxynitride film, a gallium oxide film, or the like is preferably used.

In this embodiment, a silicon oxide film is formed to a thickness of 200 nm as the insulating layer 1116 by a sputtering method. The substrate temperature during film formation may be higher than or equal to room temperature (25° C.) and lower than or equal to 300° C., and is 100° C. in this embodiment. The silicon oxide film can be formed by a sputtering method in a rare gas (typically, argon) atmosphere, an oxygen atmosphere, or a mixed atmosphere of a rare gas and oxygen. As a target, a silicon oxide target or a silicon target may be used.

As in the case of forming the oxide semiconductor layer 1130, an entrapment vacuum pump (e.g., a cryopump) is preferably used in order to remove moisture remaining in a film formation chamber used for forming the insulating layer 1116. When the insulating layer 1116 is formed in the film formation chamber evacuated using a cryopump, the concentration of impurities in the insulating layer 1116 can be reduced. A turbomolecular pump provided with a cold trap may be used as an evacuation unit for removing moisture remaining in the film formation chamber used for forming the insulating layer 1116.

It is preferable that a high-purity gas from which impurities such as hydrogen or water are removed be used as the sputtering gas for forming the insulating layer 1116.

Next, second heat treatment is performed in an inert gas atmosphere or an oxygen atmosphere. The temperature of the heat treatment is set in the range of 200° C. to 450° C., preferably 250° C. to 350° C. For example, the heat treatment may be performed at 250° C. for one hour in a nitrogen atmosphere. By the second heat treatment, variation in electrical characteristics of the transistor can be reduced. Moreover, oxygen is supplied from the insulating layer 1116 to the oxide semiconductor layer 1131 to compensate for oxygen deficiency in the oxide semiconductor layer 1131, whereby an i-type (intrinsic) or substantially i-type oxide semiconductor layer can be formed.

Note that the second heat treatment is performed in this embodiment after the insulating layer 1116 is formed; there is no limitation on the timing of the second heat treatment. For example, the first heat treatment and the second heat treatment may be performed in succession, or the first heat treatment may double as the second heat treatment.

In the above manner, through the first heat treatment and the second heat treatment, the oxide semiconductor layer 1131 can be purified in such a manner that the oxide semiconductor is made to contain as few impurities that are not main components of the oxide semiconductor as possible, and oxygen defects in the oxide semiconductor are reduced by supplying oxygen to the oxide semiconductor, whereby the oxide semiconductor layer 1131 can be an i-type (intrinsic) oxide semiconductor layer.

Figure 8D:
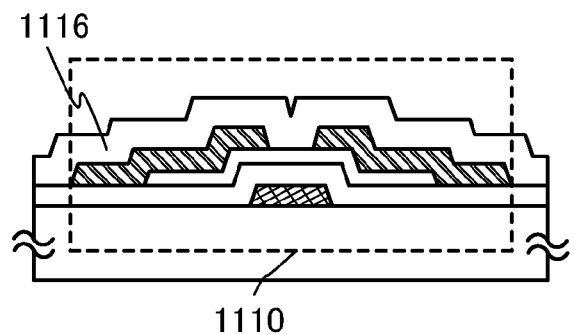

Through the above process, the transistor 1110 is formed (FIG. 8D).

Figure 8E:
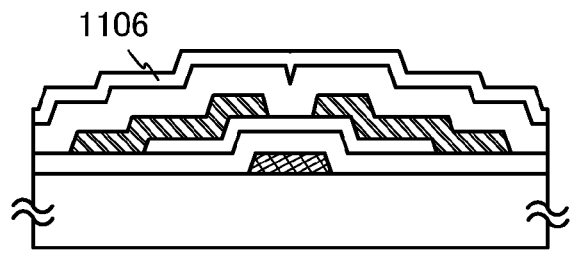
Figure 9A:
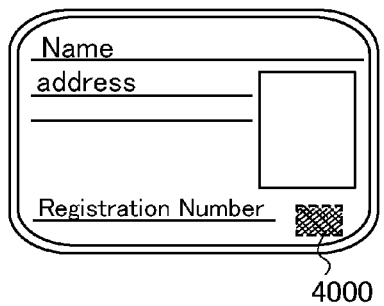
FIGS. 9A to 9F are diagrams illustrating application examples of an RFID according to one embodiment of the present invention.
Figure 9B:
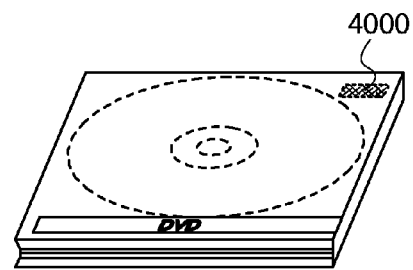
Figure 9C:
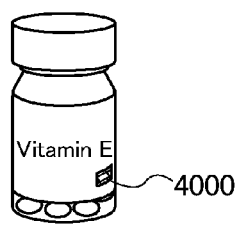
Figure 9D:
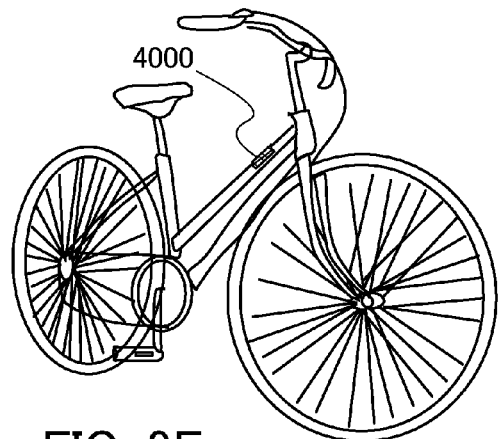
Figure 9E:
Figure 9F:
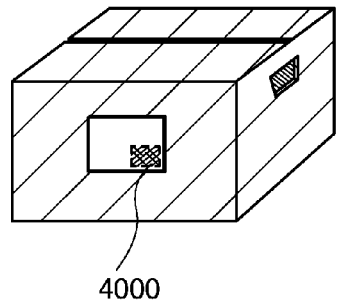

Note that a protective insulating layer 1106 is preferably formed over the insulating layer 1116 (see FIG. 8E). The protective insulating layer 1106 prevents entry of hydrogen, water, or the like from the outside. As the protective insulating layer 1106, a silicon nitride film, an aluminum nitride film, or the like can be used, for example. There is no particular limitation on the method for forming the protective insulating layer 1106; an RF sputtering method is suitable because of its high productivity. In addition, an organic material such as polyimide, acrylic, or benzocyclobutene can be used for the protective insulating layer 1106. With the use of such an organic material, the insulating properties can be further improved. The protective insulating layer 1106 may be a stack of the above materials, and for example, can have a structure where a polyimide film is stacked over a silicon nitride film. The protective insulating layer 1106 having such a structure can prevent entry of water, hydrogen, or the like and enhance the insulating properties.

After the protective insulating layer 1106 is formed, heat treatment may be performed at 100° C. to 200° C. for 1 hour to 30 hours in the air.

With the use of the purified oxide semiconductor layer formed according to this embodiment, the off-state current of the transistor can be sufficiently reduced. Therefore, with the use of the above-described transistor in a protection circuit, the loss of power at the protection circuit can be minimized when the amplitude of a carrier wave or an amplitude-modulated wave received by an antenna is low.

The configurations, methods, and the like described in this embodiment can be combined as appropriate with any of the configurations, methods, and the like described in the other embodiments.

Embodiment 7

In this embodiment, application examples of an RFID including the protection circuit of one embodiment of the present invention are described with reference to FIGS. 9A to 9F. The RFID is widely used and can be provided for, for example, products such as bills, coins, securities, bearer bonds, documents (e.g., driver's licenses or resident's cards, see FIG. 9A), packaging containers (e.g., wrapping paper or bottles, see FIG. 9C), recording media (e.g., DVD software or video tapes, see FIG. 9B), vehicles (e.g., bicycles, see FIG. 9D), personal belongings (e.g., bags or glasses), foods, plants, animals, human bodies, clothing, household goods, and electronic devices (e.g., liquid crystal display devices, EL display devices, television sets, or cellular phones), or tags on products (see FIGS. 9E and 9F).

An RFID 4000 of one embodiment of the present invention is fixed to a product by being mounted on a printed wiring board, attached to a surface thereof, or embedded therein. For example, the RFID 4000 is fixed to each product by being embedded in paper of a book, or embedded in an organic resin of a package. Since the RFID 4000 of one embodiment of the present invention can be reduced in size, thickness, and weight, it can be fixed to a product without spoiling the design of the product. Further, bills, coins, securities, bearer bonds, documents, or the like can have an identification function by being provided with the RFID 4000 of one embodiment of the present invention, and the identification function can be utilized to prevent counterfeiting. Moreover, the efficiency of a system such as an inspection system can be improved by providing the RFID of one embodiment of the present invention for packaging containers, recording media, personal belongings, foods, clothing, household goods, electronic devices, or the like. Vehicles can also have higher security against theft or the like by being provided with the RFID of one embodiment of the present invention.

As described above, by using the RFID including a protection circuit according to one embodiment of the present invention for each of the uses described in this embodiment, the protection circuit in the RFID having a predetermined communication distance can operate to cut high power which might be applied to elements in the RFID, even when the communication distance is extremely short. Therefore, reliability of authentication or security of products can be improved.

EXAMPLE 1

In this example, the characteristics of a transistor used in a protection circuit according to one embodiment of the present invention will be described.

Figure 10A:
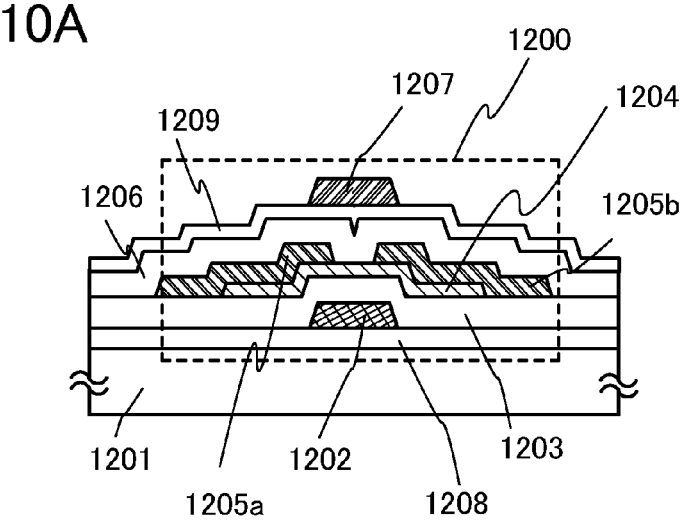
FIGS. 10A and 10B are a cross-sectional view illustrating an example of a transistor according to one embodiment of the present invention and a diagram showing electrical characteristics of the transistor.

FIG. 10A illustrates a structure of a transistor of this example.

In the transistor illustrated in FIG. 10A, an insulating layer 1208 is formed over a substrate 1201. As the substrate 1201, a 0.7 mm thick glass substrate was used, and as the insulating layer 1208, a 300 nm thick silicon oxide layer was formed using a sputtering apparatus.

Next, a first gate electrode 1202 is formed over the insulating layer 1208. As the first gate electrode 1202, a 100 nm thick tungsten layer was formed using a sputtering apparatus.

Next, a gate insulating layer 1203 is formed over the insulating layer 1208 and the first gate electrode 1202. As the gate insulating layer 1203, a 100 nm thick silicon oxynitride layer was formed using a plasma CVD apparatus. Note that the relative permittivity (s) of the silicon oxynitride layer is 4.1 F/m.

Next, an oxide semiconductor layer 1204 is formed over the gate insulating layer 1203. The oxide semiconductor layer 1204 was formed using a sputtering apparatus under the following conditions: the flow rate of Ar was 30 sccm, the flow rate of $O_2$ was 15 sccm, the electric power was 0.5 kW (DC), the pressure was 0.4 Pa, the T-S distance was 60 mm, the substrate temperature was 200° C., and the thickness was 30 nm. As a sputtering target, a metal oxide target having a composition ratio of $In_2O_3:Ga_2O_3:ZnO=1:1:1$ [molar ratio] was used.

After the oxide semiconductor layer 1204 was formed, heat treatment was performed at 450° C. in a nitrogen atmosphere for an hour using a baking furnace.

Next, a source electrode 1205a and a drain electrode 1205b are formed. The source electrode 1205a and the drain electrode 1205b were formed using a sputtering apparatus by forming a 100 nm thick titanium layer, forming a 200 nm thick aluminum layer over the titanium layer, and forming a 100 nm thick titanium layer over the aluminum layer. Note that the source electrode 1205a and the drain electrode 1205b have a three-layer structure of the titanium layer, the aluminum layer, and the titanium layer, and the three layers were formed successively under vacuum.

Next, an insulating layer 1206 is formed over the gate insulating layer 1203, the source electrode 1205a, the drain electrode 1205b, and the oxide semiconductor layer 1204. As the insulating layer 1206, a 300 nm thick silicon oxide layer was formed using a sputtering apparatus.

Next, a protective insulating layer 1209 is formed over the insulating layer 1206. As the protective insulating layer 1209, a 200 nm thick silicon nitride film was formed using a sputtering apparatus.

Then, a second gate electrode 1207 is formed over the protective insulating layer 1209. As the second gate electrode 1207, a 100 nm thick titanium layer was formed using a sputtering apparatus.

Through the above process, a transistor 1200 is formed. The semiconductor layer of the transistor 1200 is formed with the oxide semiconductor layer and can provide transistor characteristics with a small off-state current. In addition, the second gate electrode is provided opposite the first gate electrode, and the threshold voltage of the transistor 1200 can therefore be adjusted using the second gate electrode.

Figure 10B:
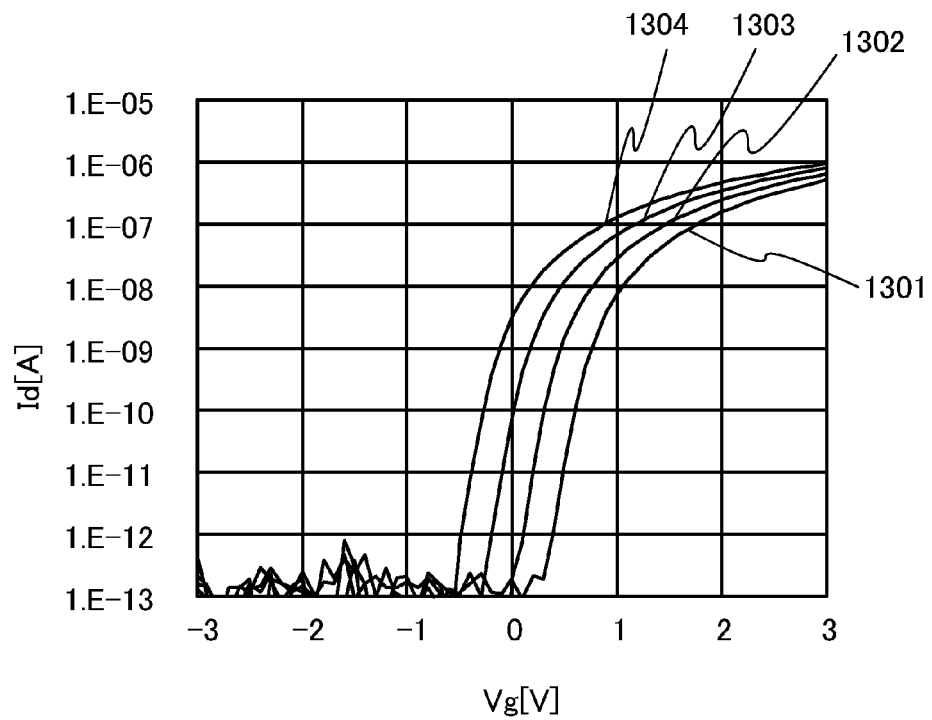

Next, the drain current Id vs. gate voltage Vg characteristics which are one kind of electrical characteristics of transistors were measured using the transistor 1200 described in this example. The results of the measurement of the drain current Id vs. gate voltage Vg characteristics are shown in FIG. 10B. The channel length L is 3 μm, and the channel width W is 5 μm. Note that the voltage Vd between the source electrode and the drain electrode of the transistor is 1 V.

A solid line 1301, a solid line 1302, a solid line 1303, and a solid line 1304 in FIG. 10B show drain currents (Id) at a voltage Vd of 1 V applied between the source electrode and the drain electrode and at voltages Vg applied to the first gate electrode 1202 which varies from −3 V to 3 V in increments of 0.1 V.

Note that the solid line 1301 shows a drain current Id with no voltage Vbg (i.e., 0 V) applied to the second gate electrode 1207; the solid line 1302, with a voltage Vbg of 1 V applied to the second gate electrode 1207; the solid line 1303, with a voltage Vbg of 2 V applied to the second gate electrode 1207; the solid line 1304, a voltage Vbg of 3 V applied to the second gate electrode 1207.

The transistor characteristic diagram in FIG. 10B shows that the threshold voltage Vth relative to the voltage Vg applied to the first gate electrode 1202 shifts in the negative direction as the voltage Vbg applied to the second gate electrode 1207 increases.

The transistor characteristic diagram in FIG. 10B also shows that the off-state current of the transistor 1200 is $1 \times 10^{-12}$ A or less which is extremely small when the oxide semiconductor layer 1204 is used as the semiconductor layer of the transistor 1200.

In this manner, the transistor described above is used in a semiconductor device including a protection circuit. Thus, it is possible to obtain a highly reliable semiconductor device because the protection circuit operates normally even when a signal with high amplitude is supplied to the semiconductor device and consumes little power when the communication distance is long.

This application is based on Japanese Patent Application serial no. 2010-175416 filed with Japan Patent Office on Aug. 4, 2010, the entire contents of which are hereby incorporated by reference.

What is claimed is:

1. A semiconductor device comprising:
    a rectifier circuit configured to generate an internal voltage by rectifying a wireless signal received via an antenna; and
    a protection circuit including a first transistor and a second transistor, the first transistor comprising a gate electrode and a drain electrode each electrically connected to the antenna and a source electrode grounded, and the second transistor comprising a source electrode electrically connected to the antenna and a gate electrode and a drain electrode each grounded,
    wherein the first transistor and the second transistor each comprise an oxide semiconductor layer, and
    wherein the protection circuit is configured to operate when an amplitude of the wireless signal received by the antenna is equal to or greater than a minimum operating voltage for the rectifier circuit.

2. The semiconductor device according to claim 1, wherein the wireless signal is a carrier wave.

3. The semiconductor device according to claim 1, wherein the wireless signal is an amplitude-modulated wave.

4. The semiconductor device according to claim 1, wherein the protection circuit is configured to cut part of an excess of the amplitude of the wireless signal, when the amplitude of the wireless signal is higher than a limit voltage.

5. The semiconductor device according to claim 1, wherein the protection circuit is configured to suppress an increase in the internal voltage, when the amplitude of the wireless signal is higher than a limit voltage.

6. A semiconductor device comprising:
a rectifier circuit configured to generate an internal voltage by rectifying a wireless signal received via an antenna;
a protection circuit including a first transistor and a second transistor, the first transistor comprising a gate electrode and a drain electrode each electrically connected to the antenna and a source electrode grounded, and the second transistor comprising a source electrode electrically connected to the antenna and a gate electrode and a drain electrode each grounded;
a demodulation circuit configured to generate an internal signal by demodulating the wireless signal received via the antenna;
a constant voltage circuit configured to output as a power supply voltage a constant voltage obtained from the internal voltage generated by the rectifier circuit;
a logic circuit configured to analyze the power supply voltage generated by the constant voltage circuit and the internal signal generated by the demodulation circuit and generate a response signal; and
a modulation circuit configured to output a modulated signal to the antenna by modulating a signal from the logic circuit,
wherein the first transistor and the second transistor each comprise an oxide semiconductor layer, and
wherein the protection circuit is configured to operate when an amplitude of the wireless signal received by the antenna is equal to or greater than a minimum operating voltage for the rectifier circuit.

7. The semiconductor device according to claim 6, wherein the wireless signal is a carrier wave.

8. The semiconductor device according to claim 6, wherein the wireless signal is an amplitude-modulated wave.

9. The semiconductor device according to claim 6, wherein the protection circuit is configured to cut part of an excess of the amplitude of the wireless signal, when the amplitude of the wireless signal is higher than a limit voltage.

10. The semiconductor device according to claim 6, wherein the protection circuit is configured to suppress an increase in the internal voltage, when the amplitude of the wireless signal is higher than a limit voltage.

11. The semiconductor device according to claim 6, further comprising a clock generation circuit electrically connected to the logic circuit, the modulation circuit, and the constant voltage circuit.

12. A semiconductor device comprising:
a rectifier circuit configured to generate an internal voltage by rectifying a wireless signal received via an antenna;
a protection circuit including a first transistor and a second transistor, the first transistor comprising a first gate electrode and a drain electrode each electrically connected to the antenna, a source electrode grounded, and a second gate electrode, and the second transistor comprising a source electrode electrically connected to the antenna, a first gate electrode and a drain electrode each grounded, and a second gate electrode;
a demodulation circuit configured to generate an internal signal by demodulating the wireless signal received via the antenna;
a constant voltage circuit configured to output as a power supply voltage a constant voltage obtained from the internal voltage generated by the rectifier circuit;
a logic circuit configured to analyze the power supply voltage generated by the constant voltage circuit and the internal signal generated by the demodulation circuit and generate a response signal; and
a modulation circuit configured to output a modulated signal to the antenna by modulating a signal from the logic circuit,
wherein the first transistor and the second transistor each comprise an oxide semiconductor layer, and
wherein the protection circuit is configured to operate when an amplitude of the wireless signal received by the antenna is equal to or greater than a minimum operating voltage for the rectifier circuit.

13. The semiconductor device according to claim 12, wherein the wireless signal is a carrier wave.

14. The semiconductor device according to claim 12, wherein the wireless signal is an amplitude-modulated wave.

15. The semiconductor device according to claim 12, wherein the protection circuit is configured to cut part of an excess of the amplitude of the wireless signal, when the amplitude of the wireless signal is higher than a limit voltage.

16. The semiconductor device according to claim 12, wherein the protection circuit is configured to suppress an increase in the internal voltage, when the amplitude of the wireless signal is higher than a limit voltage.

17. The semiconductor device according to claim 12, further comprising a clock generation circuit electrically connected to the logic circuit, the modulation circuit, and the constant voltage circuit.

18. The semiconductor device according to claim 12, wherein the second gate electrode of the first transistor and the second gate electrode of the second transistor are electrically connected to an output terminal of the rectifier circuit.

19. A semiconductor device comprising:
a rectifier circuit configured to generate an internal voltage by rectifying a wireless signal received via an antenna;
a protection circuit including a first transistor and a second transistor, the first transistor comprising a first gate electrode and a drain electrode each electrically connected to the antenna, a source electrode grounded, and a second gate electrode, and the second transistor comprising a source electrode electrically connected to the antenna, a first gate electrode and a drain electrode each grounded, and a second gate electrode;
a demodulation circuit configured to generate an internal signal by demodulating the wireless signal received via the antenna;
a constant voltage circuit configured to output as a power supply voltage a constant voltage obtained from the internal voltage generated by the rectifier circuit;
a logic circuit configured to analyze the power supply voltage generated by the constant voltage circuit and the internal signal generated by the demodulation circuit and generate a response signal;
a modulation circuit configured to output a modulated signal to the antenna by modulating a first signal from the logic circuit; and
a switching circuit configured to control the protection circuit with a second signal from the logic circuit,
wherein the first transistor and the second transistor each comprise an oxide semiconductor layer, and
wherein the protection circuit is configured to operate with reference to the internal voltage output from the rectifier circuit through the switching circuit with the second signal from the logic circuit when an amplitude of the wireless signal received by the antenna is equal to or greater than a minimum operating voltage for the rectifier circuit.

20. The semiconductor device according to claim 19, wherein the wireless signal is a carrier wave.

21. The semiconductor device according to claim 19, wherein the wireless signal is an amplitude-modulated wave.

22. The semiconductor device according to claim 19, wherein the protection circuit is configured to cut part of an excess of the amplitude of the wireless signal, when the amplitude of the wireless signal is higher than a limit voltage.

23. The semiconductor device according to claim 19, wherein the protection circuit is configured to suppress an increase in the internal voltage, when the amplitude of the wireless signal is higher than a limit voltage.

24. The semiconductor device according to claim 19, further comprising a clock generation circuit electrically connected to the logic circuit, the modulation circuit, and the constant voltage circuit.

25. The semiconductor device according to claim 19, wherein the second gate electrode of the first transistor and the second gate electrode of the second transistor are electrically connected to an output terminal of the rectifier circuit.

* * * * *